(12) United States Patent
Goncharov et al.

(10) Patent No.: US 6,583,873 B1
(45) Date of Patent: Jun. 24, 2003

(54) OPTICAL DEVICES HAVING A WAVELENGTH-TUNABLE DISPERSION ASSEMBLY THAT HAS A VOLUME DISPERSIVE DIFFRACTION GRATING

(75) Inventors: Alexander F. Goncharov, Rockville, MD (US); Viktor V. Struzhkin, Bethesda, MD (US)

(73) Assignee: The Carnegie Institution of Washington, Washington, DC (US)

( * ) Notice: Subject to any disclaimer, the term of this patent is extended or adjusted under 35 U.S.C. 154(b) by 165 days.

(21) Appl. No.: 09/668,167

(22) Filed: Sep. 25, 2000

(51) Int. Cl.[7] .............................. G01J 3/28; G01J 3/12
(52) U.S. Cl. ...................................... 356/326; 356/331
(58) Field of Search ................................ 356/300–334; 359/506

(56) References Cited

U.S. PATENT DOCUMENTS

| | | |
|---|---|---|
| 3,600,093 A | 8/1971 | McMahon .................. 356/100 |
| 4,752,130 A | 6/1988 | George et al. |
| 4,834,474 A | 5/1989 | George et al. |
| 5,011,284 A | 4/1991 | Tedesco et al. |
| 5,153,670 A | 10/1992 | Jannson et al. |
| 5,221,957 A | 6/1993 | Jannson et al. |
| 5,247,343 A | 9/1993 | Burch |
| 5,442,438 A | 8/1995 | Batchelder et al. |
| 5,442,439 A | 8/1995 | Battey et al. |
| 5,491,344 A | 2/1996 | Kenny et al. |
| 5,559,597 A | 9/1996 | Battey et al. |
| 5,591,981 A | 1/1997 | Heffelfinger et al. |
| 5,661,557 A | 8/1997 | Da Silva et al. |
| 5,689,333 A | 11/1997 | Batchelder et al. |
| 5,751,415 A | 5/1998 | Smith et al. |
| 5,842,995 A | 12/1998 | Mahadevan-Jansen et al. |
| 5,856,869 A | 1/1999 | Cooper et al. |
| 5,863,504 A | 1/1999 | Heffelfinger et al. |
| 5,873,831 A | 2/1999 | Bernstein et al. |
| 5,885,531 A | 3/1999 | Heffelfinger et al. |
| 6,025,601 A | * 2/2000 | Trulson et al. ........... 250/461.2 |

OTHER PUBLICATIONS

Holographic Imaging Spectrographs, HoloSpec, Spectrographs & Accessories (Product Brochure).
High–Performance Raman Spectroscopic System Based on Single Spectrograph, by Munsok Kim, Harry Owen and Paul R. Carey, Applied Spectroscopy vol. 47, No. 11, 67 pp. 1780–1783, 1993.
Wavelength performance of holographic optical elements, by Thomas Stone and Nicholas George; Applied Optics, vol. 24, No. 22, pp. 3797–3810 ,Nov. 1985.

(List continued on next page.)

Primary Examiner—Zandra V. Smith
Assistant Examiner—Gordon J Stock, Jr.
(74) Attorney, Agent, or Firm—Morgan, Lewis & Bockius LLP

(57) ABSTRACT

A spectrometer has a source of illumination radiation having a plurality of spectral wavelengths, a bandpass filter, a dispersive beamsplitter disposed in an optical path of said source of illumination radiation, an illumination radiation rejection filter, and a spectrograph disposed in a path of radiation from a sample illuminated by illumination radiation from said source of illumination radiation. The dispersive beamsplitter, the bandpass filter, the illumination radiation rejection filter and spectrograph are tunable in correspondence to a selected one of the plurality of spectral wavelengths of the source of illumination radiation. The dispersive beamsplitter directs the selected one of the plurality of spectral wavelengths of illumination radiation to a sample and directs elastically scattered and reflected radiation from the sample out of a measurement beam of light emanating from the sample. The inelastically scattered light passes through the dispersive beamsplitter essentially unaffected and is directed to the illumination radiation rejection filter and the spectrograph.

28 Claims, 13 Drawing Sheets

OTHER PUBLICATIONS

Axial Transmissive ƒ1.8 Imaging Raman Spectrograph with Volume–Phase Holographic Filter and Grating, by David E. Battey et al., Applied Spectroscopy, vol. 47, No. 11, 1993 pp. 1913–1919, 1993.

The Bell System Technical Journal, by Herwig Kogelnik, vol. 48, No. 9, pp. 2909–2947, Nov. 1969.

Raman Imaging System with Dual Holographic Grating Tunable Filter, by David M. Pallister et al., Applied Spectroscopy, vol. 48, No. 8, pp. 1015–1020., 1994.

Proceedings Reprint, SPIE, Reprinted from Practical Holography IX, Feb. 6–8, 1995 vol. 2406, pp. 259–267.

Process Raman spectroscopy Atomic spectroscopy, IM Pub. vol. 7, No. 1, Jan./Feb. 1995, 5 pages.

Kaiser Optical Systems, Inc., by James A. Arns, vol. 2404, pp. 174–181, Feb., 1995, pp. 1–8.

Laser Focus World, Industry turns to Raman spectroscopy as tool, by Harry Owen and Michael Pelletier, Oct., 1995.

Raman Microprobe with Holographic Beamsplitter for Low–Frequency Operation, by David M. Pallister et al., vol. 46, No. 10, 1992, Applied Spectroscopy, pp. 1469–1473.

Performance of a Holographic Supernotch Filter, by Christian L. Schoen et al., Applied Spectroscopy, vol. 47, No. 3, pp. 305–308, 1993.

Holographic Notch Filter by Low–Wavenumber Stokes and Anti–Stokes Raman Spectroscopy, by Bijun Yang et al., Applied Spectroscopy, vol. 45, No. 9, pp. 1533–1536, 1991.

Use of a Rapid Scanning Stigmatic Raman Imaging Spectrograph in the Industrial Environment, by K.P.J. Williams et al., vol. 25, pp. 131–138, 1994.

Instrumentation; Principles and Spectroscopic Applications of Volume Holographic Optics, by James M. Tedesco et al., vol. 65, No. 9, May 1, 1993, pp. 441–449.

* cited by examiner-

OPTICAL DEVICES HAVING A WAVELENGTH-TUNABLE DISPERSION ASSEMBLY THAT HAS A VOLUME DISPERSIVE DIFFRACTION GRATING

The U.S. Government has a paid-up license in this invention and the right in limited circumstances to require the patent owner to license others on reasonable terms as provided for by the terms of Grant No. 431-3860A awarded by the NSF Center for High Pressure Research.

BACKGROUND OF THE INVENTION

1. Field of the Invention

This invention pertains to devices incorporating dispersive volume transmission gratings, and more particularly to Raman and/or fluorescence spectrometers that have continuous tuning of the excitation wavelength.

2. Discussion of Related Art

Holographic volume transmission gratings are used in a variety of devices and are proven to have high efficiency over a wide spectral range. (For example, see, Tedesco et al, U.S. Pat. No. 5,011,284, the entire contents of which are incorporated herein by reference.) Unlike the situation with widely used reflection surface-relief gratings, the directions of the incident and efficiently diffracted beams are symmetrical with respect to the periodicity of the grating with volume transmission gratings. Wavelength tuning in spectrometers with reflection gratings can be performed by rotating the grating in a Littrow-like configuration. In George et al. U.S. Pat. No. 4,752,130, the entire contents of which are incorporated herein by reference, spectrometers, monochrometers and other devices are described that use volume transmission gratings. However, the devices described in George et al require individually moving at least one grating and at least one mirror with complex devices to match the diffracted and/or incident beam directions, determined by Bragg's conditions. The resultant optical layouts described in George et al are too cumbersome to have significant practical applications. Instead, commercially available spectrometers (e.g., HOLOPROBE made by KAISER OPTICAL SYSTEMS, INC.) utilize "snap-in" gratings. Other conventional devices have stacks of gratings for changing the spectral range of coverage. Such devices are not practical for many applications, including scientific research applications, in which flexible changes of both the excitation wavelength and the spectral range are essential.

For example, flexible changes of both the excitation wavelength and the spectral range are important for spectrometers used for analyzing secondary radiation emitted by a sample under primary excitation by a laser or other source of radiation when it is necessary to distinguish between Raman and fluorescence signals. The Raman signal has essentially the same wavenumber shift with respect to the excitation frequencies, while the luminescence one preserves the positions of the bands on the wavelength scale. Thus, measurements with two or more different excitations permit one to sort out the Raman and fluorescence signals. Moreover, in many cases, the Raman intensities depend critically on the excitation wavelength (resonance Raman), and provide information about electronic and other properties of the sample. Similar information can be obtained from the fluorescence excitation spectra, by measuring the intensity of a particular band as a function of the excitation wavelength. Also, wavelength tuning in a wide spectral range is necessary when measuring the optical properties of substances to investigate their electronic properties.

Therefore, there is a need for improved wavelength tunable devices, such as improved wavelength tunable spectrometers and spectrographs. The conventional devices used for measurements of emission, absorption or reflection spectra in a wide spectral range are surface relief single-grating spectrographs with a CCD array detector. Although adequate for some applications, this kind of conventional device is large and bulky when high spectral resolution is required, e.g., 0.1 nm or higher, because of the necessity to increase the focal length of the spectrograph, and also normally has a decreased throughput resulting from such physical limitations.

Some conventional spectrographs that use reflection gratings have a very important feature that allows the user to change the spectral coverage (and spectral resolution, concomitantly) rapidly without any realignment, thus preserving the calibration. This is realized by having two or more gratings on the same rotation turret, driven by a computer. However, current spectrographs with volume gratings use a different principle: they have either snap-in gratings, or they have a stack of gratings dispersing the spectra on different strips of the CCD shifted in a direction perpendicular to the spectral direction. In the first case, recalibration is needed after each change of the grating, while in the second case, throughput loss results. Neither method is flexible enough for many applications, including scientific measurements, because a change of the central wavelength would require a different grating.

Prism-based selecting elements are widely used in practice for laser intra-cavity wavelength selectors and laser monochrometers. Prism-based selecting elements have high transmission and can be wavelength-tuned, but because of very limited dispersion, prism filters are inadequate for many applications. For example, in the case of Raman spectroscopy, low-frequency laser plasma lines (below 100–200 cm$^{-1}$) leak through the system and appear in the Raman spectra as spikes, which can mask the useful Raman signal. Surface-relief grating monochrometers serve adequately in some cases, but they have several problems. Aberrations originating from their off-axis spherical collimating mirror optics cause significant problems. Thus, using surface-relief gratings in the part of the system delivering the laser beam (laser filters and beam splitters) would deteriorate the quality of the laser spot on the sample and, consequently, the spatial resolution of the device. The throughput of grating monochrometers is polarization and wavelength-dependent and normally does not exceed 50%. Grating monochrometers are also bulky, and in the case of the double-subtractive monochrometer, which is used as the laser-rejecting stage for conventional Raman spectrometers, require accurate and time-consuming alignment. The same is true for the use of a grating monochrometer as a laser beam-splitter. Consequently, although the use of surface relief grating optics is adequate for some laser and nonlaser spectroscopic applications, they are not adequate for devices that require a rapid change of excitation and/or spectral range, they are bulky and complicated, and they are not sufficiently efficient for many applications.

In the case of Raman/fluorescence/excitation spectrometers, it is extremely important to filter out the excitation radiation so that none of the unwanted radiation (e.g., plasma lines of the ion laser tube) is present as spurious bands in the measured spectra. Another important feature of these devices is to provide a way to inject the excitation radiation into the optical system and then to reject the excitation radiation before the spectrograph stage (i.e., analysis of the spectrum). Different types of filters are currently in use for cleaning the laser radiation. Simple color glass filters are adequate for non-demanding applications such as for observing fluorescence spectra or high-frequency Raman spectra. In this case, a neutral beam splitter can be used for injecting the laser radiation and a color glass rejection filter for removing the laser radiation from the signal. Since color glass filters have a very broad edge between the transmission and absorption spectral range, the use of this configuration is very limited. Interference filters and beam splitters offer more of an abrupt edge for both edge and notch type dichroic filters.

There are two types of interference filters: multilayer thin dielectric films with different refractive indexes deposited between two highly reflective layers (i.e., the Fabry-Perot principle) and, alternatively, low/high refractive index periodic structures produced by laser interference in photosensitive materials (i.e., the "holographic" technique). In the latter case, because the refractive index can be changed smoothly with respect to the coordinates of the medium, much sharper changes in the transmission/reflection coefficient can be achieved with much better rejection close to the excitation wavelength. Dielectric interference filters are widely used in Raman spectroscopy as laserline band-pass filters and also as signal band-pass filters for Raman imaging. Dielectric interference filters also can be manufactured as step-like short-pass and long-pass types to pass and/or reject the laser excitation, but because of relatively long transmission tails, sufficient rejection for Raman spectroscopy cannot be achieved and the low-frequency spectral range remains unavailable.

Holographic filters (volume gratings) offer much better performance compared to dielectric filters. There are two major types of volume gratings: conformal reflection and untilted fringe transmission holograms, which differ by orientation of the fringes relative to their respective surfaces. (See, Tedesco et al, Principles and Spectroscopic Applications of Volume Holographic Optics, *Analytical Chemistry*, 65, 441A–449A (1993), the entire contents of which are incorporated herein by reference.) The first type of volume grating is nondispersive and is widely used in practice as a notch filter with up to 6 O.D. Non-dispersive volume gratings have superior performance compared to dielectric interference type filters. (See, Yang et al, Holographic Notch Filter for Low-wavenumber Stokes and Anti-Stokes Raman Spectroscopy, *Applied Spectroscopy*, 45, 1533–1536 (1991); and Schoen et al, Performance of Holographic Supernotch Filter, *Applied Spectroscopy*, 47, 305–308 (1993). The entire contents of both are incorporated herein by reference.) A nondispersive volume grating has also been used as a laser beam splitter in Da Silva et al, U.S. Pat. No. 5,661,557, the entire contents of which are incorporated herein by reference. The spectral position of the notch depends on the incident angle and can be adjusted by rotation of the filter in such a way that the laser wavelength matches the spectral range of minimum transmission, but the filter is transparent to as low of a portion of the Raman signal as possible. The use of the notch filter as a beam splitter is normally limited to one excitation wavelength because using it for the next excitation wavelength (e.g., of the argon ion laser) would require rotation of the notch filter by a large angle, so that it becomes impractical. Such conventional devices thus require changing the notch filter for every change of the excitation wavelength.

The second type of holographic grating is a dispersive element (volume diffraction grating). Accordingly, in view of the above-noted problems, the present invention provides new and improved devices using dispersive volume diffraction gratings.

SUMMARY OF THE INVENTION

It is an object of the present invention to provide devices which incorporate dispersive volume transmission gratings for spectroscopic applications which are compact.

It is another object of this invention to provide devices that incorporate dispersive volume transmission gratings in devices that are efficient and conveniently wavelength tunable.

It is another object of this invention to provide a Raman spectrometer that is efficient and compact, and is conveniently tunable over excitation wavelengths.

A preferred embodiment of this invention relates to a spectrometer which has a source of illumination radiation, a dispersive beam splitter disposed in an optical path of light from the source of illumination radiation, and a spectrograph disposed in the path of radiation from a sample illuminated by the illumination radiation from the source. The dispersive beam splitter is tunable to disperse a selected wavelength component of the illumination radiation from the source of illumination radiation. In particular, the dispersive beam splitter according to a preferred embodiment of the invention has a wavelength tunable dispersion assembly that includes a volume dispersion diffraction grating and a mirror which are rotatable together substantially as a unit about a common axis of rotation. In a preferred embodiment, the spectrometer also has an optical bandpass filter arranged between the source of illumination and the dispersive beam splitter. In a second preferred embodiment of a spectrometer according to the invention, a monochrometer replaces the optical bandpass filter of the first preferred embodiment.

The invention is also directed to a wavelength tunable dispersive beam splitter which has a light input port, a light output port and a wavelength tunable dispersion assembly disposed between the light input and the light output port. The wavelength tunable dispersion assembly has a mirror and a volume dispersion diffraction grating which are substantially fixed in orientation and displacement with respect to each other and are rotatable together substantially as a unit with respect to a common axis of rotation.

The invention is also directed to an optical bandpass filter that has a light input port, a light output port and a wavelength tunable dispersion assembly disposed between the light input port and the light output port. The wavelength tunable dispersion assembly has a mirror and a volume dispersive diffraction grating which are substantially fixed in orientation and displacement with respect to each other. The volume dispersive diffraction grating and the mirror are rotatable together substantially as a unit with respect to a common axis of rotation.

The invention is also directed to a spectrograph that has an input aperture, a detector arranged in a substantially fixed orientation and displacement with respect to the input aperture and a wavelength tunable dispersion assembly. The wavelength tunable dispersion assembly of the spectrograph has a mirror and a volume dispersion diffraction grating that are substantially fixed in orientation and displacement with respect to each other. The volume dispersive diffraction grating and the mirror are rotatable together substantially as a unit with respect to a common axis of rotation.

The invention is also directed to a monochrometer that has a light input aperture and a wavelength tunable dispersion assembly proximate the light input aperture. The wavelength tunable dispersion assembly has a mirror and a volume dispersive diffraction grating that are substantially fixed in orientation and displacement with respect to each other. The volume dispersive diffraction grating and the mirror are rotatable together substantially as a unit with respect to a common axis of rotation. The invention is also directed to a combination of monochrometers, as described above, arranged in series to increase dispersion or further suppress the elastically scattered or reflected radiation from the primary illumination radiation source.

BRIEF DESCRIPTION OF THE DRAWINGS

These and other objects and advantages of the invention will become more apparent and more readily appreciated from the following brief description of the presently preferred embodiments of the invention taken in conjunction with the accompanying drawings, of which.

DETAILED DESCRIPTION OF THE PREFERRED EMBODIMENT

Figure 1:
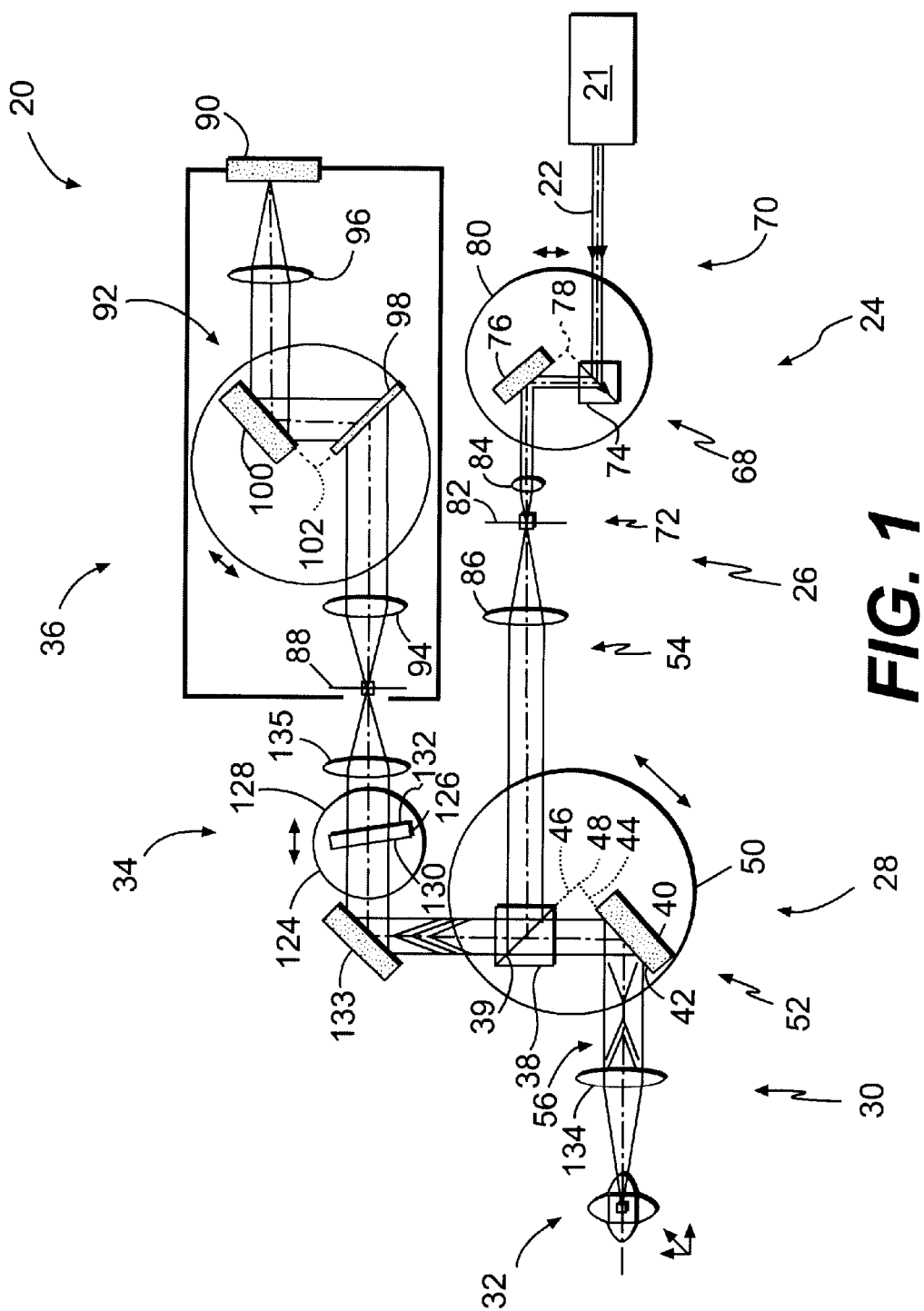
FIG. 1 is a schematic illustration of a spectrometer according to a first preferred embodiment of the invention in which an optical bandpass filter, a wavelength tunable dispersive beam splitter and a spectrograph according to a preferred embodiment of the invention are also illustrated.

FIG. 1 is a schematic illustration of a first preferred embodiment of a spectrometer according to the invention indicated generally by reference numeral 20. The spectrometer 20 has a source of illumination radiation 21 that produces an illumination beam of electromagnetic radiation 22, an optical bandpass filter 24, a spatial filter 26, an optical beam splitter 28, a microscope 30, a sample region 32, a rejection filter 34 and a spectrograph 36. In the preferred embodiment, at least one of the bandpass filter 24, beam splitter 28, rejection filter 34, or spectrograph 36 has a volume dispersive diffraction grating attached to a mechanical assembly that is movable relative to an incident beam of electromagnetic radiation. More preferably, each of the optical bandpass filter 24, beam splitter 28, rejection filter 34 and spectrograph 36 has a volume dispersive diffraction grating attached to a mechanical assembly such that each is movable with respect to an incident beam of electromagnetic radiation. Current applications contemplate using the spectrometer 20 with electromagnetic radiation spanning the ultraviolet, visible and infra-red regions of the spectrum. The term "light" used herein is not restricted to only visible light and is meant to broadly cover ultraviolet, visible and infra-red light.

In the preferred embodiments, the beam splitter 28 is a dispersive beam splitter disposed in an optical path of light from the source of illumination radiation 21. The dispersive beam splitter 28 is a wavelength tunable dispersive beam splitter that has a volume dispersive diffraction grating 38 held in a substantially fixed orientation and displacement with respect to a mirror 40. In the preferred embodiments, the volume dispersive diffraction gratings are substantially flat slabs of optical material that have periodic distributions that cause diffraction, sandwiched between optical material such as glass. In some applications, the diffractive material is sandwiched between flat pieces of glass, while in other applications the diffractive material is sandwiched between prism elements, as illustrated in FIG. 1. Preferably, the mirror 40 has a flat surface 42 such that a plane 44 substantially coincident with the flat surface 42 of the mirror 40 intersects a plane 46 substantially coincident with the longitudinal direction of the diffraction grating. Preferably, the mirror 40 and volume dispersive diffraction grating 38 are substantially fixed with respect to each other and rotatable about an axis of rotation 48.

In the preferred embodiment, the axis of rotation 48 is substantially coincident with the intersection of the planes 44 and 46. The planes 44 and 46 illustrated in FIG. 1 are mathematical constructs useful for aligning the mirror 40 with respect to the volume dispersive diffraction grating 38 and with respect to their common axis of rotation 48. In the example illustrated in FIG. 1, the mirror 40 and volume dispersive diffraction grating 38 are separated from each other. In other embodiments, the mirror 40 and volume dispersive diffraction grating 38 may be arranged to come into physical contact with each other at the axis of rotation 48.

The mirror 40 and volume dispersive diffraction grating 38 are mounted to a support stage 50. A wavelength tunable dispersion assembly, including the mirror 40, volume dispersive diffraction grating 38 and support stage 50 are constructed and arranged relative to a light input port 54 such that the mirror 40 and volume dispersive diffraction grating 38 are rotatable with respect to a beam of light travelling through the light input port 54. The light input port 54 may be simply a region in space where an input beam travels or may be an aperture and/or other optical components such as a window and/or lenses. Similarly, the wavelength tunable dispersive beamsplitter 28 has a light output port 56 which may be a region of space where an output beam of light travels, or may further include an aperture stop, window and/or lenses.

In the preferred embodiment, the support stage 50 has a flat surface to which the mirror 40 and volume dispersive diffraction grating 38 are attached. Preferably, the plane 44 that is coincident with the substantially flat surface 42 of the mirror 40 is substantially orthogonal to the surface of the support stage 50. Similarly, the plane 46 that is substantially coincident with, or parallel to, a flat surface of the volume dispersive diffraction grating element 39 is substantially perpendicular to the surface of the support stage 50. In the preferred embodiment, the support stage 50 is a table rotatable about the axis of rotation 48 of the mirror 40 and volume dispersive diffraction grating 38. The rotatable table 50 is operatively attached to a drive assembly which includes a drive motor or hand-driven actuator that causes the support stage 50 to rotate about the axis 48 (not shown in the FIGURES). In the preferred embodiment, the drive assembly includes a drive motor operatively attached to the support stage 50. A suitable arrangement has a stepping motor attached directly to an axle connected to a lower surface of the support stage 50, thus causing the support stage 50 to be selectively rotated about the axis of rotation 48.

In operation, electromagnetic radiation, such as ultraviolet, visible and/or infra-red light, enters the light input port 54 so that it is incident upon the volume dispersive diffraction grating 38. Electromagnetic radiation at the "tuned" wavelength is dispersed from the volume dispersive diffraction grating 38 toward the mirror 40. The electromagnetic radiation incident upon the mirror 40 is reflected to pass through the light output port 56. The light travel path is reversible for the "tuned" wavelength. In other words, light at the "tuned" wavelength entering through the output port 56 is reflected from the mirror 40 is dispersed by the volume dispersive diffraction grating 38 to exit through the input port 54. However, light that is not at the "tuned" wavelength that enters through the output port 56 is reflected from the mirror 40 and passes through the volume dispersive diffraction grating 38 without a substantial amount of dispersion. In this way, the dispersive beam splitter 28 can be used to direct light at an illumination wavelength toward a sample beyond the light output port 56 and separate reflected and elastically scattered light from a measurement beam of light that passes through the volume dispersive diffraction grating 38. For example, in Raman spectroscopy, light is inelastically scattered, thus having either a longer or shorter wavelength from the illumination radiation. The dispersive beamsplitter 38 thus serves the dual purpose of directing the appropriate "tuned" wavelength of light to a sample along the incident path and separating light of the illumination wavelength from other wavelengths along the return path.

Figure 2:
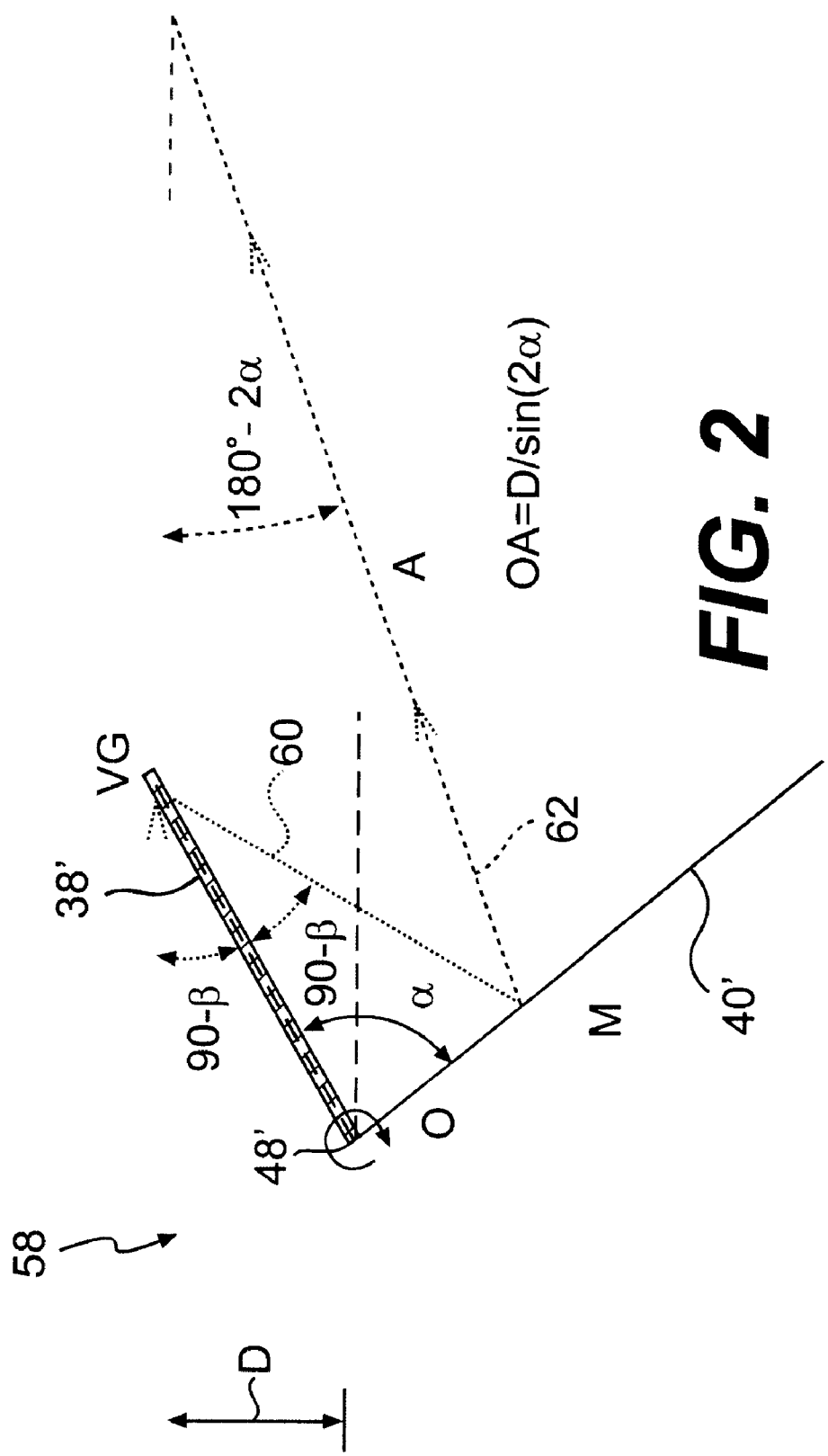
FIG. 2 is a schematic illustration explaining general concepts of a wavelength tunable dispersion assembly according to a preferred embodiment of the invention.

FIG. 2 is a schematic illustration which is helpful in explaining the general concept of the wavelength tunable dispersion assembly 52 illustrated in FIG. 1. Collimated light is incident upon the volume dispersive diffraction grating 38' at an angle $\beta$ in air. The volume dispersive diffraction grating 38' is disposed between plane parallel glass plates rather than between two 45° glass prisms, as illustrated by volume dispersive diffraction grating 38 in FIG. 1. In this example, the grating pattern has fringes which are substantially untilted with respect to the plane surfaces of the plane parallel glass plates (i.e., perpendicular to the plane surface). The diffracted light propagates essentially symmetrically with respect to the grating plane and Bragg's condition will be maintained, i.e., $$2\sin(\beta)=\lambda N$$

where $\lambda$ is the wavelength of the incident light and N is the density of the fringes of the grating. This relationship specifies the central wavelength that will be diffracted efficiently at the incident angle $\beta$. The angle $\beta$ is the angle between the direction of the incident radiation to the normal to the grating plane. To tune the wavelength, the grating 38' and mirror 40' are rotated together with respect to the axis of rotation 48'. The incident angle at the new rotated position is $\beta+\delta\beta$. As a result, the direction of the diffracted beam is deflected by $2\times\delta\beta$. The plane mirror 40' is fixed at an angle a with respect to the volume dispersive diffraction grating 38'.

Figure 3:
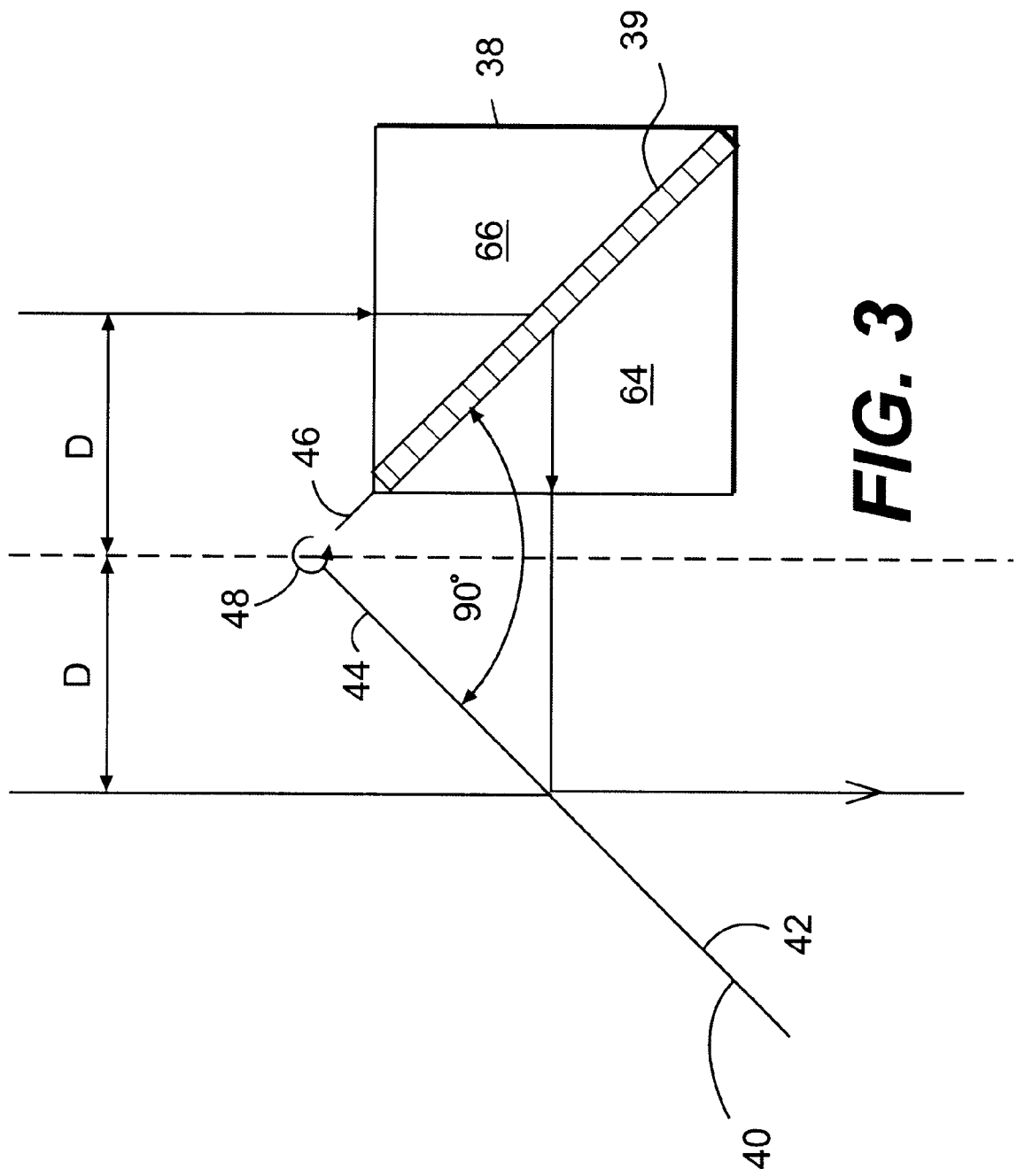
FIG. 3 is a schematic illustration of another example of a wavelength tunable dispersion assembly according to a preferred embodiment of the invention.

In FIG. 2, the mirror 40' and volume dispersive diffraction grating 38' are illustrated as being in physical contact, in contrast to FIG. 1 where the mathematical constructs of the planes 44 and 46 were utilized to demonstrate the alignment of the mirror 40 to the volume dispersive diffraction grating 38. The axis of rotation 48' is substantially perpendicular to the incident beam, and arbitrary ray 58 in the incident beam of light is displaced by a distance D from the axis of rotation (i.e., the length of a line perpendicular to the arbitrary ray 58 and the axis of rotation 48'). The arbitrary ray 58 is diffracted by the volume dispersive diffraction grating 38' leading to a dispersed ray 60 and reflected ray 62, reflected from mirror 40'. The reflected ray 62 passes through point A which is a distance OA from the origin point O on the axis of rotation 48', where the line segment OA is parallel to the arbitrary ray 58. The distance OA is $$OA=D/\sin(2\alpha)$$

where $\alpha$ is the angle between the mirror 40' and the volume dispersive diffraction grating 38'. The distance OA is independent of the wavelength. For the special case when $\alpha=90°$, the reflected ray 62 is displaced by a distance D from the axis of rotation from the other side with respect to the incident beam 58. This case is illustrated in FIG. 3 for a volume dispersion grating confined between two identical forty-five degree right angle prisms.

The beam passing through the volume dispersive diffraction grating 38' and reflecting from the mirror 40' forms an angle $\gamma=180°-2\alpha$ relative to the original undiffracted ray, which is also wavelength independent. Consequently, this demonstrates that rotating the volume dispersive diffraction grating 38' and mirror 40' together as a unit about the axis of rotation 48' does not change the direction and position of the diffracted and reflected beam 62. The wavelength of the diffractive beam 62, on the other hand, changes due to the change in the angle of incidence with respect to the volume dispersive diffraction grating 38'.

Light with a wavelength $\lambda'$ slightly above or slightly below the wavelength satisfying Bragg's condition will exit the system at angles other than that specified above, and can be determined according to $$\sin\beta'=\lambda'N-\sin\beta,$$

which is wavelength dependent. Thus, a ray of light with wavelength $\lambda'$ which does not satisfy Bragg's condition travelling along the path 58 will not travel on the paths 60 and 62.

FIG. 2 illustrates the general concepts of the wavelength tunable dispersion assembly with specific reference to the volume dispersive diffraction grating 38' that has two parallel plane glass plates. The general principles described above can be applied for volume dispersion gratings confined between any prisms which are symmetrical with respect to the grating plane.

FIG. 3 shows the volume dispersive diffraction grating 38 and mirror 40 in more detail. Forty-five degree right angle prisms 64 and 66 sandwich the volume dispersive diffraction element 39 to form a cube-like volume dispersion diffraction grating element 39. The periodic array of grating fringes in the volume dispersive diffraction grating element 39 are substantially perpendicular to the most proximate surfaces of the prisms 64 and 66 in the example of FIG. 3. Generally, the fringes of the volume dispersion diffractive grating element 39 may be at angles other than 90° with respect to the nearest surfaces of the prisms 64 and 66, but in the case where the fringes are parallel to the nearest surfaces of the prisms 64 and 66, the diffraction grating is a non-dispersive diffraction grating. The use of optical prisms with refractive indices larger than 1 permits one to achieve an increased density of fringes N for the diffraction grating since it increases the angle of incidence in the medium. In this case, Bragg's condition for almost normal incidence with respect to the cube surface becomes $$2 \sin \beta = \lambda N / n,$$

where n is the refractive index of the prism material. This assumes that the refractive index of the prism material is close to the average refractive index of the volume dispersive diffraction grating material. $\beta$ is again the angle of incidence in air. As noted above in regard to FIG. 2, rotation of the volume dispersive diffraction grating 38 and mirror 40 in unison about an axis of rotation 48 changes neither the direction nor position of the diffractive beam while permitting tuning of the central wavelength $\lambda$ of the passband.

Rotating the support stage 50 causes a mirror 40 and volume dispersive diffraction grating 38 to rotate together, substantially as a unit, about axis of rotation 48 (see, FIG. 1), thus leading to "tuning" of the wavelength which satisfies Bragg's conditions. Thus, if one changes the wavelength of the illumination light entering through the input port 54, one also rotates the support stage 50 to tune the beam splitter to the new illumination wavelength. Light entering the input port 54 continues to exit through the same exit port 56 and light following a return path entering output port 56 either travels back along through input port 54 or continues through the dispersive diffraction grating 38 substantially undispersed, depending on its wavelength relative to the tuned wavelength.

The light source 21 is selected according to the desired illumination wavelengths. A wide variety of light sources are available which are suitable for use such as various lasers or gas discharge lamps. A plurality of spectral wavelengths may be present in the light produced by the source and selected by filtering, such as is the case with gas discharge lamps. Alternatively, a tunable laser may be used to produce light at a first selected illumination wavelength and may then be tuned to produce light at another illumination wavelength.

The optical bandpass filter 24 has a wavelength tunable dispersion assembly 68 which is similar in construction to the wavelength tunable dispersion assembly 52 of the dispersive beam splitter 28 in a preferred embodiment of the invention. The optical bandpass filter 24 has a light input port 70 and a light output port 72. The wavelength tunable dispersion assembly 68 has a volume dispersive diffraction element 74 which is substantially fixed in orientation and displacement with respect to a mirror 76. The volume dispersive diffraction element 74 and the mirror 76 are rotatable together substantially as a unit with respect to an axis of rotation 78. In the preferred embodiment, the wavelength tunable dispersion assembly 68 has a support stage 80 to which the volume dispersive diffraction grating 74 and mirror 76 are mounted in a similar manner as with the dispersive beam splitter 28. A drive assembly is operatively attached to the support stage 80 to rotate the support state 80 about axis of rotation 78, thereby rotating the volume dispersion diffraction grating element 74 and mirror 76 together substantially as a unit about the axis of rotation 78. The drive assembly may be constructed to be mechanically independent of the dispersive beam splitter 28, or may be mechanically coupled to the drive assembly of the dispersive beam splitter 28.

In the preferred embodiment, the output port 72 of the optical bandpass filter 24 has an aperture stop 82 and a converging lens 84. The volume dispersive grating element 74 disperses light 22 entering the light input port 70 into its constituent spectrum in a focal plane of the lens 84. The aperture stop 82 arranged at the focal plane of the lens 84 allows only light of a narrow spectral range to pass through. The spatial filter 26 includes the aperture stop 82, lens 84 and lens 86, thus sharing components with the optical bandpass filter 24. The lens 86 is a converging lens which has a longer focal length than that of lens 84. Spatial filtering is performed at a focal plane of the aperture stop 82 and the combination of lenses 84 and 86 leads to an expanded collimated output beam where the lens 86 is arranged such that the focal points of lenses 86 and 84 substantially coincide.

The general principles of the wavelength tunable dispersion assembly 68 of the optical bandpass filter 24 are the same as those of the dispersive beam splitter 28. The light input port 70 and light output port 72 remain fixed during tuning of the optical bandpass filter 24 while the support stage 80 is rotated, thus causing the volume dispersive diffraction grating 74 and mirror 76 to rotate substantially as a unit with respect to axis of rotation 78. The wavelength tunable dispersion assembly 68 is rotated to a position with respect to the incoming beam of light 22 in order to tune it to the desired passband. To tune it to a different passband, the wavelength tunable dispersion assembly 68 is rotated to a different position with respect to the incoming light 22. The optical bandpass filter 24 can be used to clean a substantially monochromatic light source such as that of a laser, or to select a band from a light source that has a plurality of wavelengths. In a preferred embodiment, using a substantially monochromatic laser, the optical bandpass filter 24 is tuned to adjust the passband to the laser wavelength, resulting in suppression of the plasma lines, thus cleaning the illumination light.

Figure 4A:
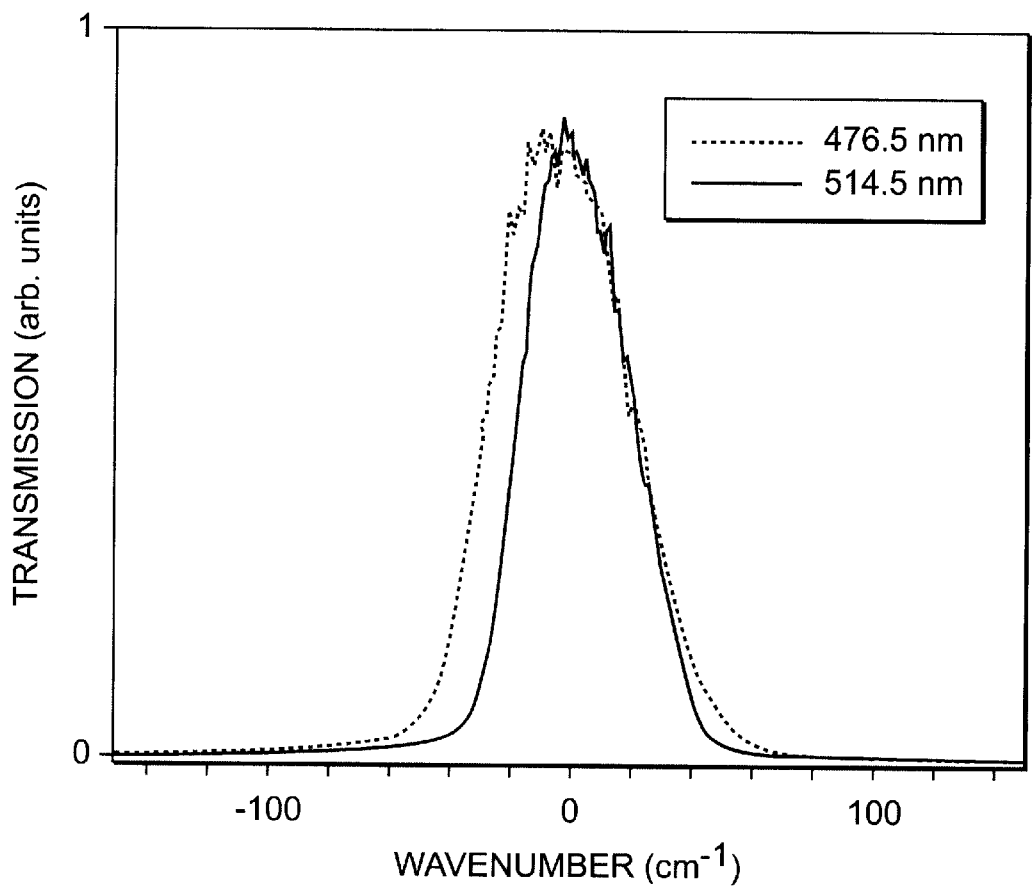
FIG. 4A shows the experimental transmission of the wavelength tunable dispersion assembly illustrated in FIG. 3 using an HLBF-514 volume dispersion diffraction grating manufactured by KAISER OPTICAL SYSTEMS, INC. for two different incident angles corresponding to two lines of the argon ion laser.
Figure 4B:
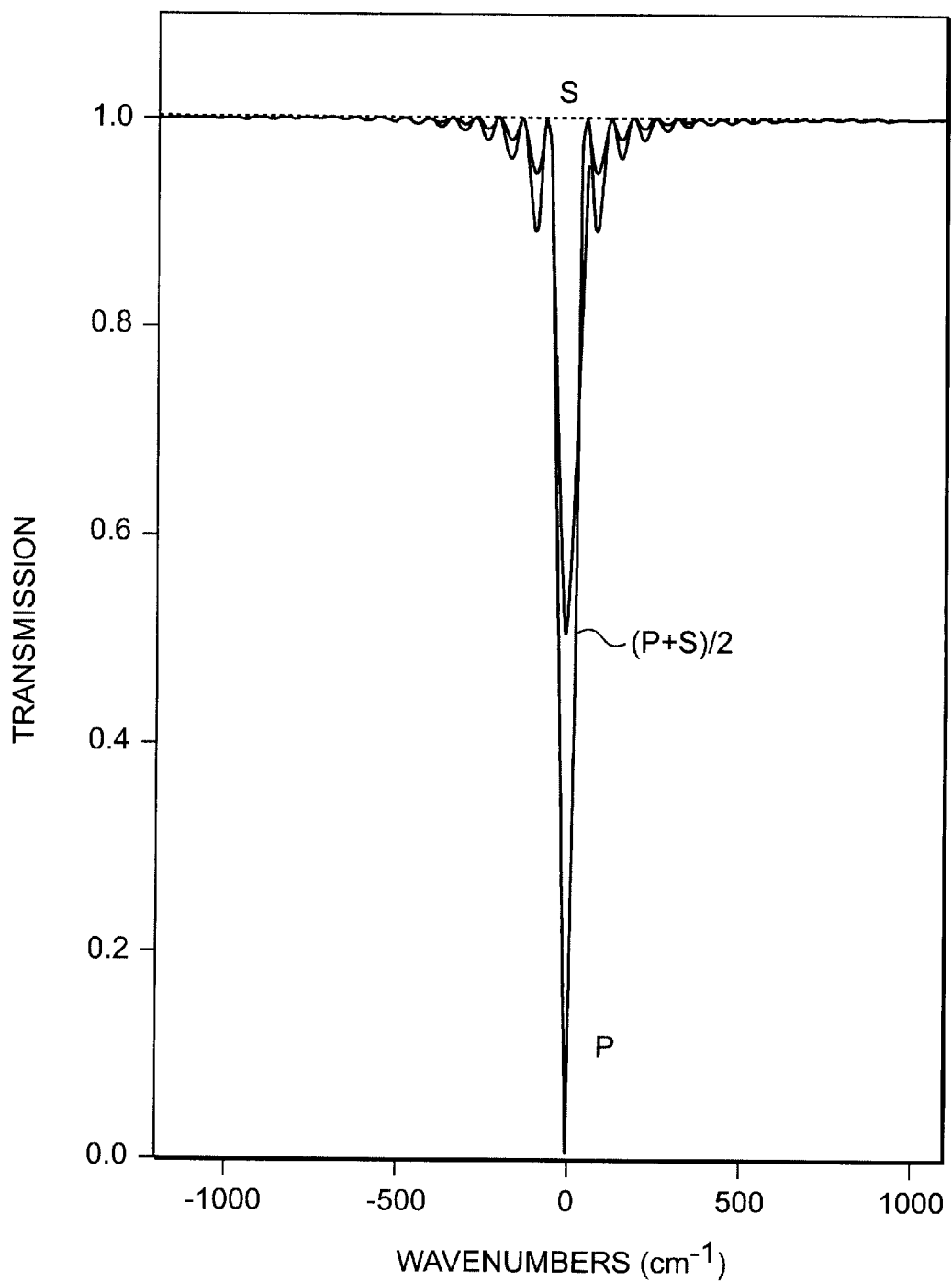
FIG. 4B shows the calculated transmission of the grating illustrated in FIG. 3 at the angular position corresponding to the green line of the argon ion laser (514.5 nm) with two different light polarizations.

The experimental transmission through both the optical bandpass filter 24 and the spatial filter 26 in which the bandpass filter 24 is tuned to each of the two argon ion laser lines is shown in FIG. 4A. The volume dispersion diffraction grating is an HLBF-514 from KAISER OPTICAL SYSTEMS, INC. The width of the passband of the optical bandpass filter 24 is determined by the angular dispersion of the volume grating and geometrical parameters of the spatial filter such as the focal length of the lens 84 and the width of the aperture 82, and does not depend critically on the wavelength. The transmission of the filter stage depends critically on the polarization of the beam. FIG. 4B shows the calculated transmission for the grating of FIG. 3 at the angular position corresponding to the green line of the argon ion laser (514.5 nm). The density of the fringes of the grating is N=4150 fringes/mm, the average refractive index of the medium is n=1.5, the modulation of the refractive index is $\Delta n=0.025$, and the thickness of the grating is d=70 $\mu$m. Use of a volume grating confined between two 45° prisms allows the design of a grating with an exceptionally narrow notch in the transmission spectrum (line width<100 cm$^{-1}$), while the secondary notches are substantially less pronounced (FIG. 4B).

Figure 5:
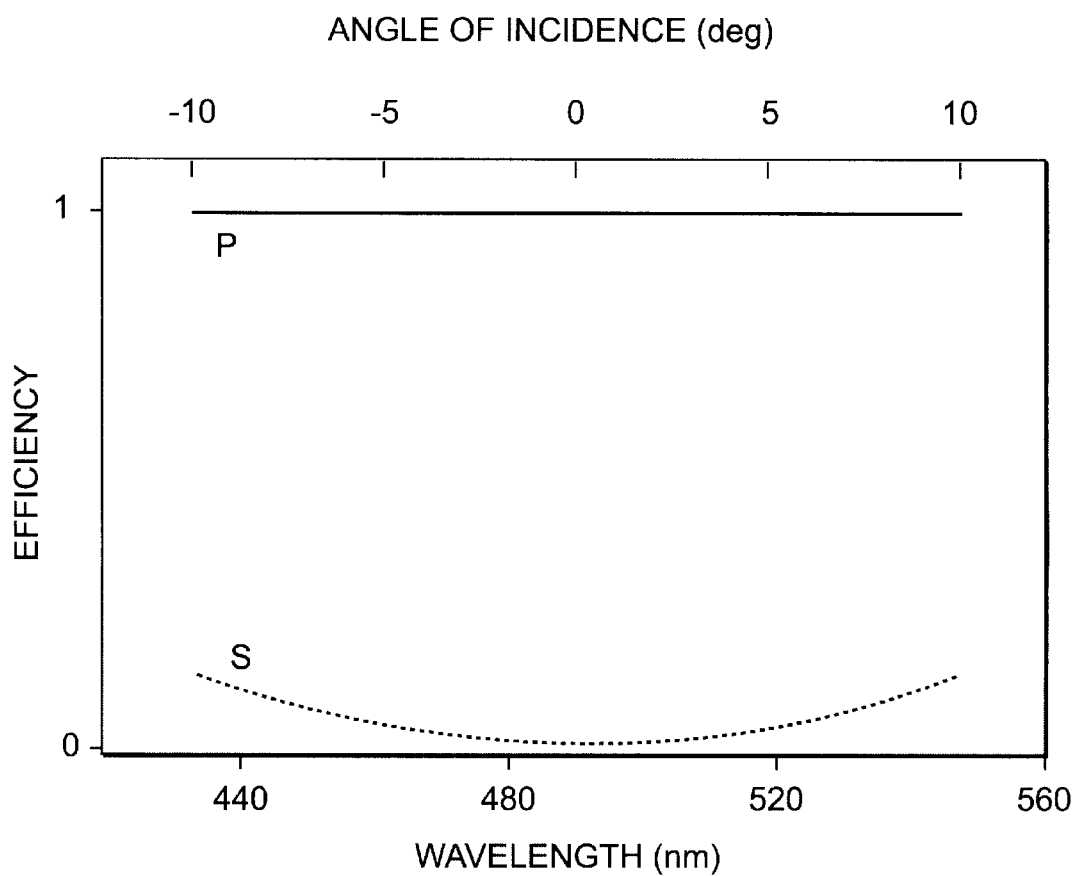
FIG. 5 shows the calculated efficiency as a function of the incident angle with two different light polarizations of the volume holographic grating illustrated in FIG. 3.

FIG. 5 shows the theoretical transmission of the filter for p-polarized and for s-polarized light as a function of angle of incidence $\eta=\beta-45°$. The density of the fringes of the grating is N=4300 fringes/mm, the average refractive index is n=1.5, the modulation of the refractive index is $\Delta n=0.025$, and the thickness of the grating is d=70 $\mu$m. The theoretical transmission for p-polarized light is nearly 1 over a wide range of wavelengths and the theoretical transmission is very small for s-polarized light with a minimum at the wavelength corresponding to $\beta=45°$. Since most ion and solid state lasers produce polarized radiation, this would require matching the polarization of the laser output and the passband. Because of the high dispersion of the volume grating and its highly wavelength selective diffraction, a very high level of rejection of unwanted radiation (e.g., plasma lines) is normally achieved. As one can see from FIG. 5, the optical bandpass filter can be tuned in a wide spectral range without sacrificing throughput. Such an optical bandpass filter has a substantially wavelength independent and narrow passband (see, FIG. 4A) and high transmission (see, FIG. 5), providing a high quality optical bandpass filter which is tunable over a wide spectral range.

The optical bandpass filter 24 and the wavelength tunable dispersive beamsplitter 28 have similar structures and can be simultaneously tuned to any wavelength around a central wavelength determined by the density or fringes of the volume grating. To tune the wavelength in a wide spectral range, e.g., corresponding to the spectral range of an argon ion laser, a rotation of only approximately ±8° is required (see, FIG. 5). This leads to a highly practical filter stage according to the invention which has reasonable dimensions for the volume gratings and mirrors. Tuning the wavelength generally does not require any realignment of the optical system according to the invention. In the case of the wavelength tunable dispersive beam splitter 28, it is preferable to use a volume grating that is constructed to have a central wavelength corresponding to an incident angle of $\beta=45°$ that does not coincide with any laser wavelength of potential use. Otherwise, unwanted reflected and scattered radiation would be directed toward the entrance of the spectrograph, causing the appearance of spurious spectral features. The inventors have found that even placing a mirror in a focal plane of the microscope 30 still led to no plasma lines being observed in a measurable part of the Raman spectrum (greater than 80 cm$^{-1}$).

The spectrograph 36 (FIG. 1) according to the preferred embodiment of the invention has an input aperture 88, a detector 90 arranged in a substantially fixed position and orientation with respect to the aperture 88 and a wavelength tunable dispersion assembly 92. The spectrograph 36 also has a collimating lens 94 which collimates electromagnetic radiation that enters the spectrograph 36 through the input aperture of the aperture stop 88. The spectrograph 36 has a focusing lens 96 which focuses dispersed light onto the detector 90. Preferably, the lenses 94 and 96 are achromatic, fast camera lenses. Although the lenses 94 and 96 are illustrated schematically as single lens elements, each may be a compound lens. The focal lengths of the lenses 94 and 96 are chosen according to the desired spectral resolution and throughput. The wavelength tunable dispersion assembly 92 illustrated in FIG. 1 is similar in construction to the wavelength tunable dispersion assemblies 52 and 68 of the wavelength-tunable dispersive beam splitter 28 and optical bandpass filter 24, respectively. The wavelength tunable dispersive assembly 92 has a volume dispersion diffraction grating 98 and a mirror 100. The volume dispersive diffraction grating 98 is similar to the volume dispersive diffraction grating 38'illustrated in more detail in FIG. 2. In contrast to FIG. 2, the mirror 100 and volume dispersive diffraction grating 98 do not come into physical contact with each other, but may be in contact if desired. The volume dispersive diffraction grating 98 and mirror 100 have substantially fixed orientations and displacements with respect to each other, and are rotatable together substantially as a unit about an axis of rotation 102.

In the preferred embodiment, the aperture stop 88 provides an input aperture of a width that can be varied to select a desired input aperture width. In the preferred embodiment, the aperture stop 88 provides a slit-shaped aperture stop providing an entrance slit for the spectrograph 36 and also provides spatial filtering. Alternatively, spatial filtering can be provided by putting the aperture stop in any other intermediate focal point along the path of radiation from the sample to the detector. The detector 90 in the preferred embodiment is a two-dimensional imaging detector such as a two dimensional imaging CCD array.

Figure 6A:
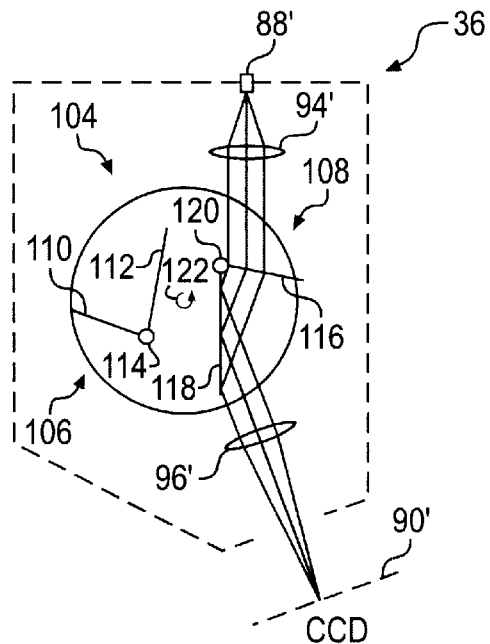
FIGS. 6A–6D are schematic illustrations of a preferred embodiment of the spectrograph that has a grating turret illustrating different orientations of the wavelength tunable dispersion assemblies with respect to the incoming light.
Figure 6B:
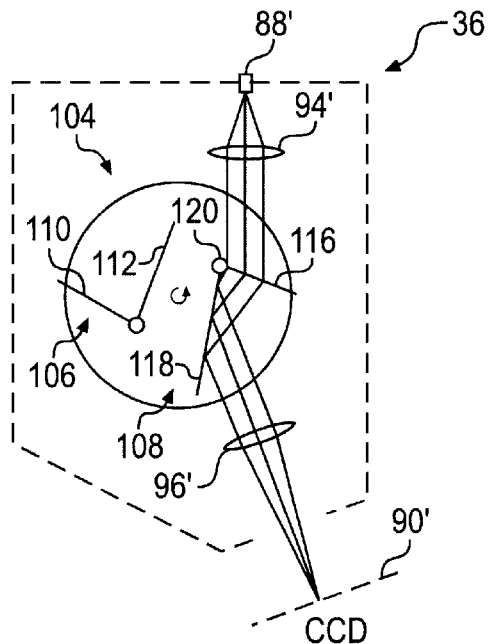
Figure 6C:
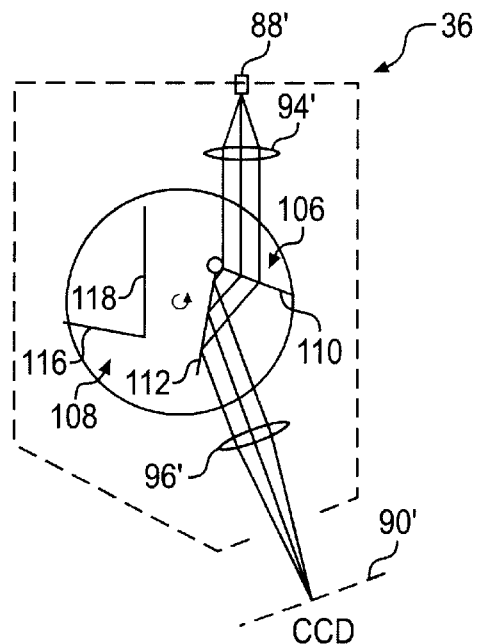
Figure 6D:
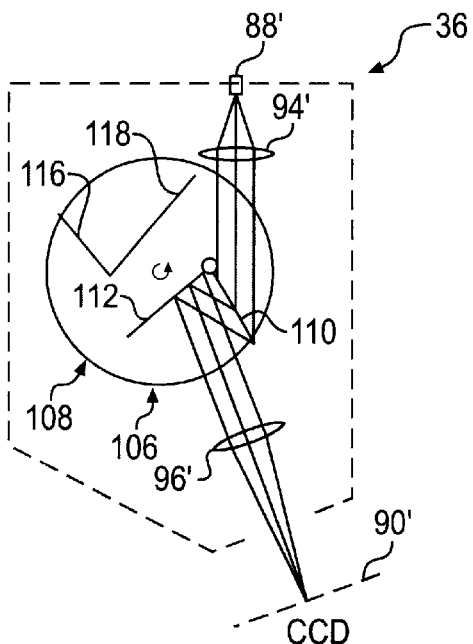

In another preferred embodiment of the spectrograph 36, the wavelength tunable dispersion assembly 92 is replaced by a grating turret 104 that has a plurality of volume dispersive diffraction gratings (FIGS. 6A–6D). The grating turret 104 illustrated in FIGS. 6A–6D has two selectable wavelength tunable dispersion assemblies 106 and 108. However, the grating turret 104 is not limited to only two wavelength tunable dispersion assemblies. One may readily extrapolate the concept illustrated in FIG. 6A–6D to include three, four, or more selectable wavelength tunable dispersion assemblies. The wavelength tunable dispersion assembly 106 includes a volume dispersion diffraction grating 110 and a mirror 112 substantially fixed in orientation and displacement with respect to each other and rotatable together substantially as a unit in a similar manner as described above in regard to the wavelength tunable dispersion assemblies 92, 68 and 52. Volume dispersive diffraction grating 110 and mirror 112 are rotatable together substantially as a unit with respect to the axis of rotation 114. Similarly, the second wavelength tunable dispersion assembly 108 has a volume dispersive diffraction grating 116 and a mirror 118 which are substantially fixed in orientation and displacement with respect to each other and rotatable together substantially as a unit with respect to axis of rotation 120. The grating turret 104 is also rotatable about an axis of rotation 122. The grating turret 104 thus provides a mechanism for moving each wavelength tunable dispersion assembly 106 and 108 into and out of a path of light entering the spectrograph 36 through an aperture defined by aperture stop 88'. FIG. 6B illustrates a case in which the wavelength tunable dispersion assembly 108 is rotated to tune to a different wavelength than that illustrated in FIG. 6A. FIGS. 6C and 6D illustrate examples of the spectrograph 36 in which the grating turret 104 is rotated to place the wavelength tunable dispersion assembly 106 into operational positions. FIG. 6C corresponds to one wavelength region of wavelength tunable dispersion assembly 106, and FIG. 6D to another wavelength region.

In the preferred embodiment, wavelength tuning is achieved by rotating the selected wavelength tunable dispersion assembly 106 or 108 about its respective axis of rotation 114 or 120. Switching between different wavelength tunable dispersion assemblies is achieved by rotating the grating turret 104 about the axis of rotation 122. Preferably, the axes of rotations 114, 122 and 120 are all parallel to each other, co-planar and axis of rotation 122 is substantially mid-way between axis of rotation 114 and axis of rotation 120. Each of the volume dispersive diffraction gratings 112 and 116, and others if desired, may be selected to be optimized to different regions of the electromagnetic spectrum (e.g., ultra-violet, visible, or infra-red regions of the electromagnetic spectrum, or portions thereof) or be chosen to have a desirable spectral resolution and coverage (gratings with differing fringe densities).

In a preferred embodiment, the laser rejection filter 34 has one or two notch filters. Suitable notch filters are commercially available, for example, suitable notch filters are manufactured by KAISER OPTICAL SYSTEMS, INC. The laser rejection filter 34 illustrated in FIG. 1 has one tunable notch filter 124. The wavelength tunable notch filter 124 has a non-dispersive volume diffraction grating 126 mounted on a rotatable support stage 128. The non-dispersive volume diffraction grating 126 differs from the volume dispersive diffraction gratings in that the fringe patterns of the gratings are substantially parallel to the entrance and exit surfaces 130 and 132, respectively, of the non-dispersive volume diffraction grating 126. The spectral position of the notch of the notch filter 124 is adjusted, i.e., tuned, by rotating the support stage 128. The spectral position of the notch is determined by the formula $$\lambda=\lambda_c\cos(\mathrm{asin}(\sin(\eta)/n)),$$

where $\eta$ is the incidence angle in air, n is the refractive index of the medium, $\lambda_c$ is the construction wavelength (corresponding to $\eta=0$). Thus, the spectral position of the notch can be tuned to another wavelength by rotating the grating 126 to a different angle $\eta$.

Figure 7:
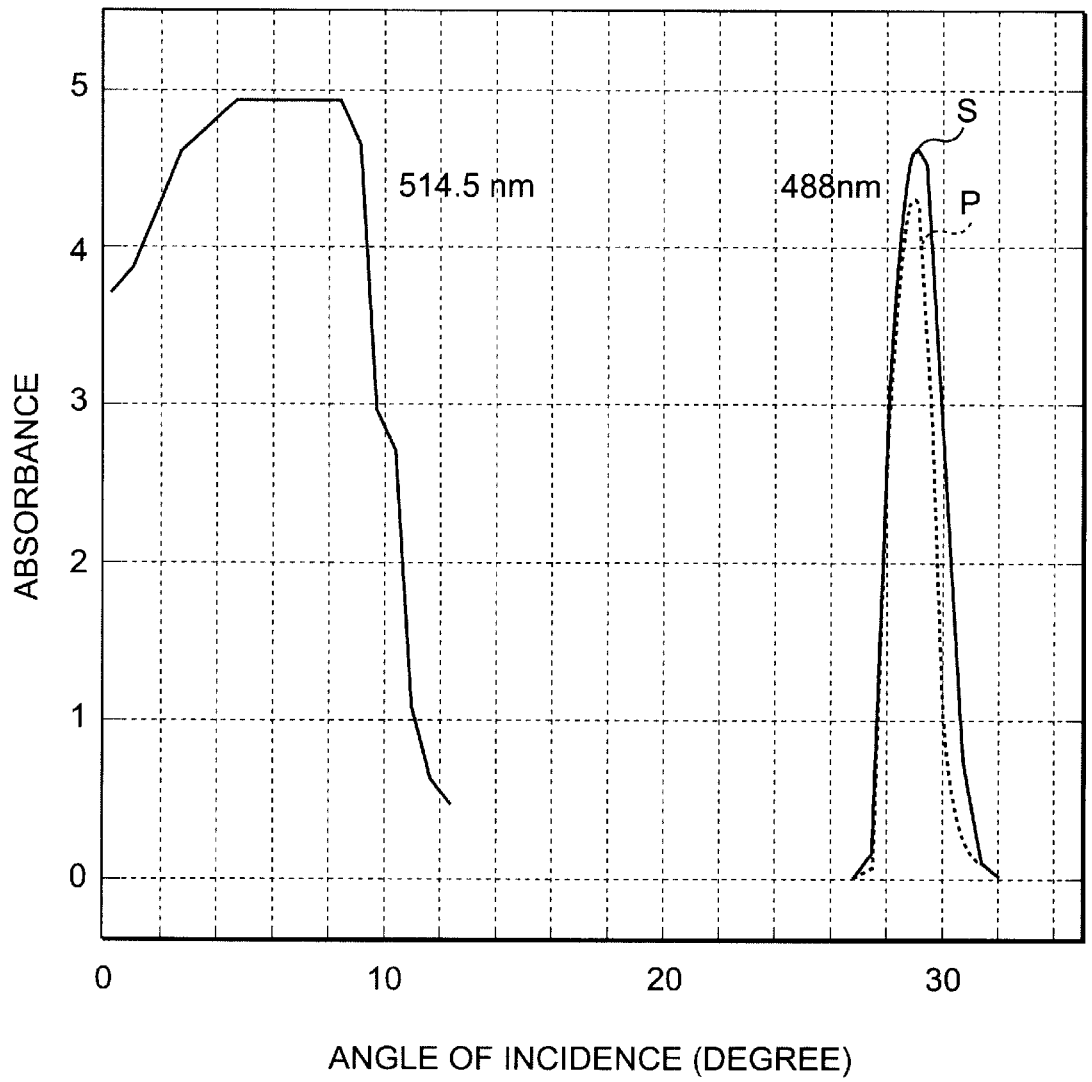
FIG. 7 shows the experimentally measured absorbance of the notch filter HNSF-514 from KAISER OPTICAL SYSTEMS, INC. as a function of the angle of incidence measured for two lines of the argon ion laser in different polarizations.
Figure 8:
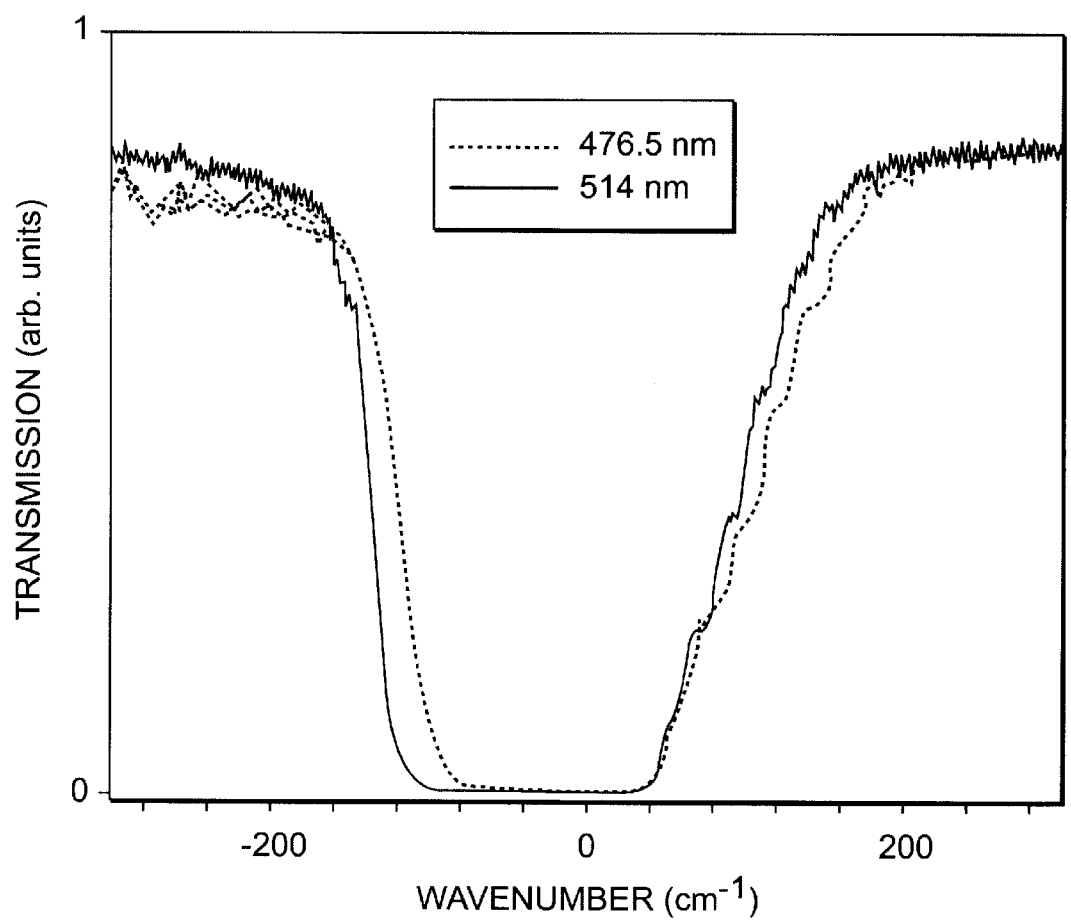
FIG. 8 shows transmission spectra of the notch filter corresponding to FIG. 7 for two optimum angular positions corresponding to each of the two lines of the argon ion laser.

FIG. 7 illustrates the absorbance as a function of angle of incidence for a super notch filter HNSF-514 obtained from KAISER OPTICAL SYSTEMS, INC. As one can see from FIG. 7, the maximum absorbance does not depend critically on the angle of incidence $\eta$ and polarization of light across a wide spectral range. Also, the angular positions of the maxima are very close for both p- and s-polarizations. For incident angles $\eta$ close to zero, curves for s- and p-polarizations coincide. FIG. 8 shows the transmission spectrum for the notch filter corresponding to FIG. 7 for each of the optimum angular positions corresponding to the two lines of an argon ion laser (476.5 nm and 514 nm). The spectral bandwidth of the notch does not depend critically on the wavelength selected in a wide spectral range. Consequently, one may use a notch filter optimized for one laser wavelength at close to normal incidence and tune it over a wide range of angles of incidence. The inventors have obtained good results with incident angles $\eta$ up to 45°. Furthermore, one may use two substantially identical notch filters disposed within the beam at the same time, but rotated in different directions.

The spectrometer 20 (FIG. 1) includes a mirror 133 that bends the path of measurement light in order to obtain a more compact arrangement. The spectrometer 20 also includes a lens 135, which may be a single lens element or a compound lens, that focuses light that exits from the rejection filter 34 onto the aperture defined by the aperture stop 88 of the spectrograph 36.

In operation, the light source 21 of the spectrometer 20 produces a beam of light 22. In the case where the light source 21 is a tunable laser, one may first tune the laser 21 to produce a beam of illumination light 22 at the desired wavelength. The beam of illumination light 22 enters the optical bandpass filter 24 through the input port 70 and is dispersed by the volume dispersive diffraction grating 74 towards the mirror 76. The volume dispersive diffraction grating 74 disperses the light 22 into its constituent spectrum in the focal plane of the lens 84, after being reflected from the mirror 76. The aperture in the aperture stop 82 allows only light of a narrow spectral range to pass through. The optical bandpass filter 24 is tuned by rotating the volume dispersion diffraction grating 74 and mirror 76 together substantially as a unit about the axis of rotation 78 by rotating the support stage 80. Tuning the passband of the optical bandpass filter 24 in this way leaves the positions of the light input port 70 and light output port 72 substantially unchanged while the passband is varied. The optical bandpass filter 24 used in conjunction with the spatial filter 26 cleans the illumination beam to provide a more monochromatic illumination source of light by suppressing plasma lines of the laser. The lens 86, which may be either a single lens element or a system of lens elements such as a compound lens, provides an expanded and substantially collimated beam of illumination light directed into the beam splitter 28.

The wavelength tunable dispersive beamsplitter 28 provides further cleaning of the illumination beam of light. The beam of light entering the wavelength tunable dispersive beam splitter 28 brings the excitation radiation of tunable wavelength to the sample while the inelastically scattered radiation is being spatially separated. The objective lens 134, illustrated schematically in FIG. 1, will typically be a compound lens system. The support stage 50 of the wavelength tunable dispersive beam splitter 28 is rotated in order to tune the beam splitter 28 to the wavelength of the illumination light. Illumination light at the desired wavelength is thus strongly dispersed by the volume dispersive diffraction grating 38, while other undesired wavelength components of the illumination light pass through the volume dispersive diffraction grating 38 substantially undiffracted. The illumination light passing through the microscope 30 is focussed onto a measurement sample disposed at the sample region 32. Illumination light directed onto a sample at the sample position 32 may be scattered both inelastically and elastically, and may also be reflected back to the microscope 30. Reflection and elastic scattering of essentially the same polarization as the excitation radiation leave the wavelength of light directed back into the microscope 30 unchanged, while the wavelength of light inelastically scattered from a sample disposed at the sample region 32 has a different wavelength from the illumination light. The spectrometer 20 is designed to measure the spectrum of inelastically scattered light.

Light travelling back from a sample at a sample region 32 through the microscope 30 reflected from the mirror 40 is then dispersed by the volume dispersive diffraction grating 38. The light which is unchanged in wavelength from the illumination light is dispersed to follow the original path of the illumination light in the reverse direction towards the spatial filter 26 and optical bandpass filter 24. The measurement light which has wavelengths different from the illumination light passes through the volume dispersive diffraction grating 38 substantially undiffracted.

The mirror 133 redirects the measurement light toward the rejection filter 34 to eliminate leakage of light at the illumination wavelength into the measurement beam of light. The notch filter 124 is adjusted to tune the notch accurately to the illumination wavelength, thus attenuating contamination of the measurement beam from the light at the illumination wavelength. A second stage notch filter will further attenuate contamination in the measurement beam of light, but also decreases the light throughput to the spectrograph 36. Measurement light is focused onto the entrance slit defined by the aperture stop 88 by the lens 135 and the lens 94 recollimates the measurement light directed to the wavelength tunable dispersion assembly 92 of the spectrograph 36. The volume dispersive diffraction grating 98 disperses measurement light which is redirected by mirror 100 and focused onto the array detector 90 by the focusing lens 96 such that the spectrum can be measured simultaneously across the array detector 90. The volume dispersive diffraction grating 98 and mirror 100 are rotated substantially as a unit with respect to axis of rotation 102 to vary the measurement regions of the spectrum. A grating turret assembly 104 (FIGS. 6A–6D) allows one to rotate the grating turret 104 to switch between wavelength tunable dispersion assemblies 106 and 108 optimized for two different regions of the electromagnetic spectrum or to be chosen to desirable spectral resolutions and coverage (i.e., gratings having differing fringe densities).

To change the operating wavelength of the spectrometer 20, one may change the illumination source 21 to a different laser or different light source, or may adjust a tunable laser to a different wavelength. With a tunable laser one tunes the laser to the desired wavelength for the output beam of illumination radiation 22. One then adjusts the optical bandpass filter by rotating the support stage 80 to a new position according to the newly selected wavelength. The optical bandpass filter 24 in conjunction with the spatial filter 26 clean undesired wavelength components from the illumination beam 22 and provide an expanded beam that is input to the wavelength tunable dispersive beam splitter 28. The support stage 50 of the wavelength tunable dispersive beamsplitter is rotated to a new position in accordance with the newly selected wavelength for the illumination light. The notch filter 124 of the rejection filter 134 is rotated to a new position to center the notch at the wavelength of the illumination light to reject light with the wavelength of the illumination light. The spectrograph 36 is operated similarly to the previous case with the previously selected illumination wavelength in accordance with the expected spectrum from the illuminated source.

Figure 9:
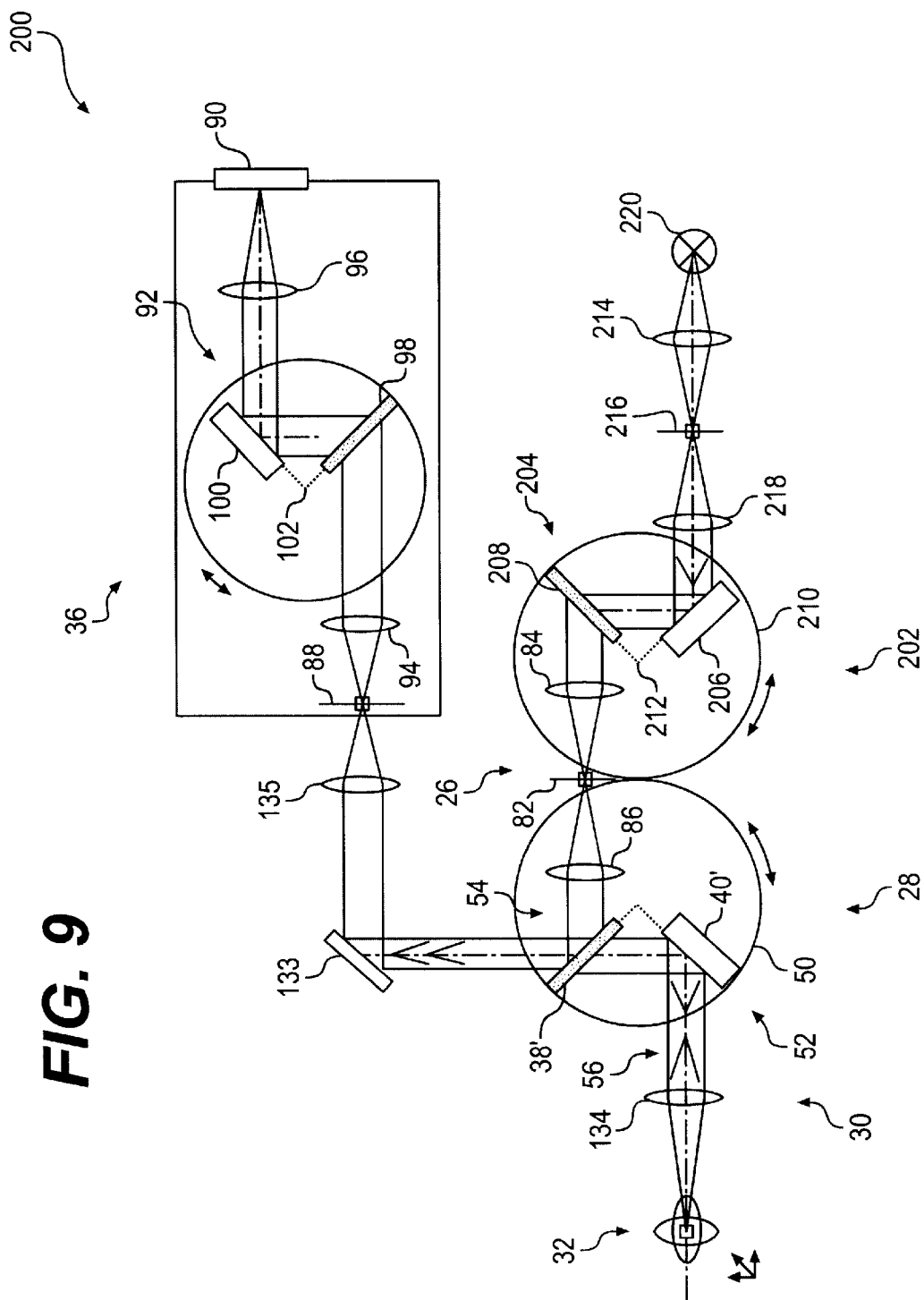
FIG. 9 is a schematic illustration of a second preferred embodiment of a spectrometer according to the invention, including a monochrometer according to the invention.

FIG. 9 is a schematic illustration of a second preferred embodiment of a spectrometer 200 according to the invention. The spectrometer is advantageous for taking measurements of excitation spectra in some preferred embodiments, but it also has other uses such as for recording fluorescence spectra. The same reference labels are used for components that are the same as for the first embodiment of the spectrometer illustrated in FIG. 1. The second preferred embodiment of the spectrometer 200 has a monochrometer 202 in place of the optical bandpass filter 24 of the first embodiment. The spectrograph 36 may also be referred to as a second monochrometer in the second preferred embodiment of the invention. The monochrometer 202 has a wavelength tunable dispersion assembly 204 in which a mirror 206 and a volume dispersion diffraction grating 208 are attached to a rotatable support stage 210 such that the mirror 206 and volume dispersive diffraction grating 208 are rotatable together substantially as a unit about axis of rotation 212. Preferably, the fringe density and orientation of the volume dispersive diffraction grating 208 is substantially the same as that of the volume dispersive diffraction grating 38' of the wavelength tunable dispersive beamsplitter 28. The monochrometer 202 also has an entrance slit defined by the aperture stop 216 and a collimating lens 218. The collimating lens 218 may be a single lens component or a compound lens system. In this embodiment, it is preferable that the light source 220 produces output light that has a plurality of wavelength components which are each suitable for use as a selected illumination beam. Light from the light source 220 is condensed by a lens 214 onto the slit produced by the aperture stop 216 to enter the monochrometer 202. The monochrometer 202 is tuned by rotating the support stage 210 to select light from the light source 220 of the desired wavelength component. The lens 84, aperture stop 82 and lens 86 provide spatial filtering in conjunction with the monochrometer 202 to provide a selected wavelength of the illumination beam directed to the beam splitter 28. The aperture stop 82 is preferably adjustable to control the bandpass width. The beamsplitter 28 operates in the manner as described above in regard to the first preferred embodiment. The remaining components of the spectrometer 200 operate in the same manner as described above in regard to the first preferred embodiment. It also recombines the illumination radiation dispersed in a spectrum at the plane of the aperture stop 82 back to a white spectrum of desired bandwidth at the sample position 32. Note that there is no rejection filter 34 disposed between the mirror 133 and monochrometer 36 in the embodiment illustrated in FIG. 9. This leads to greater throughput of the measurement radiation. One may dispose notch filters in the measurement beam of light between the beam splitter 28 and monochrometer 36 without departing from the scope and spirit of the invention.

Figure 9A:
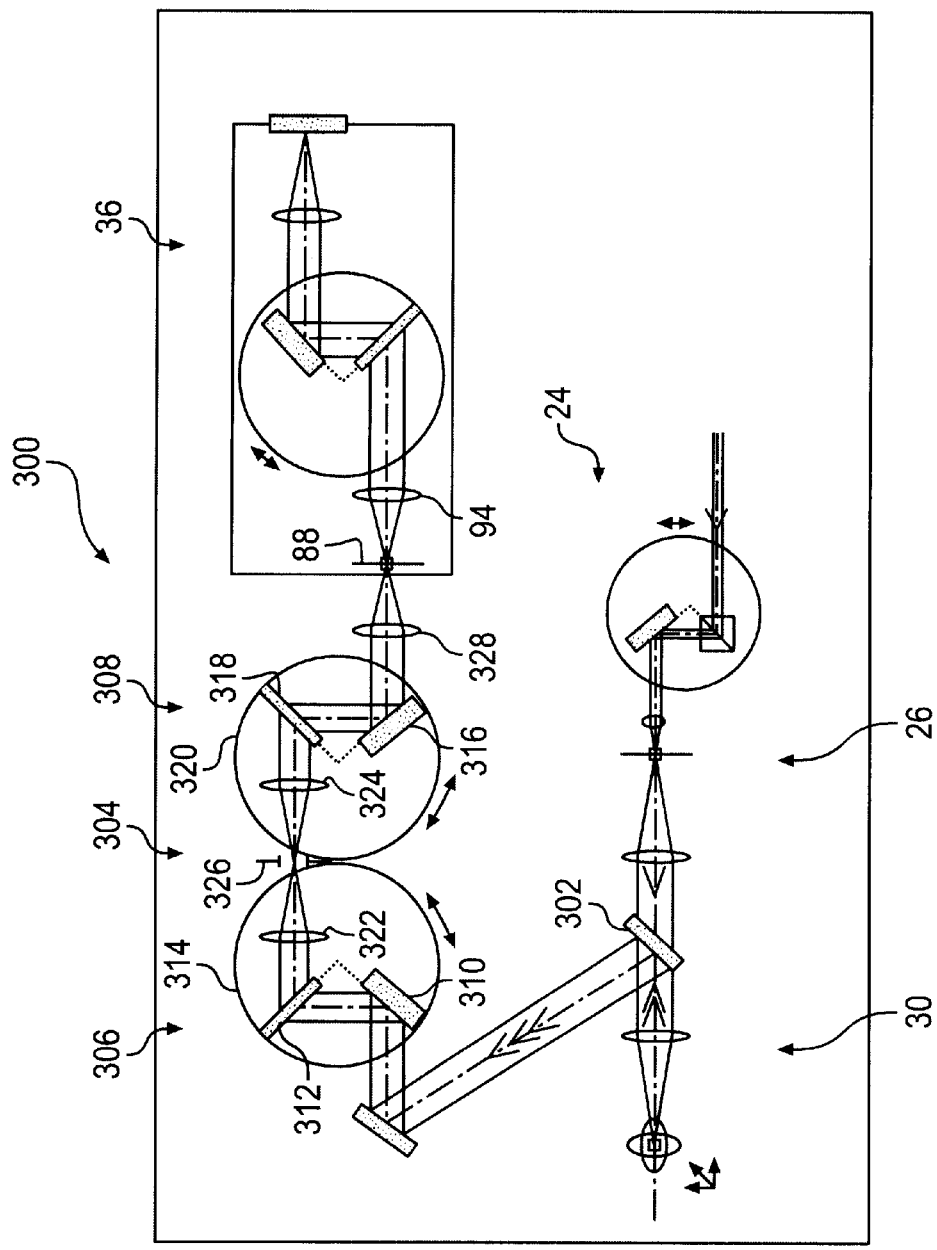
FIG. 9A is a schematic illustration of a third preferred embodiment of a spectrometer according to the invention in which a double monochrometer with dispersion subtraction serves as a rejection filter for the primary illumination radiation.

FIG. 9A illustrates a third embodiment 300 of a spectrometer according to the invention. Components of the third embodiment that are the same as the first embodiment have the same reference numerals. The spectrometer 300 has an optical bandpass filter 24, a spatial filter 26, a microscope 30 and a spectrograph 36. A beamsplitter 302 is disposed between the bandpass filter 24 and the microscope 30. In this embodiment, it is preferable that the beamsplitter 302 be a nondispersive beamsplitter (also referred to as a neutral beamsplitter). A rejection filter 304 has a first wavelength-tunable dispersion assembly 306 and a second wavelength-tunable dispersion assembly 308. The first wavelength-tunable dispersion assembly 306 has a mirror 310 and a volume dispersion diffraction grating 312 substantially fixed in orientation and displacement with respect to each other. The mirror 310 and volume dispersion grating 312 are preferably fixed to a rotatable table 314.

The second wavelength-tunable dispersion assembly 308 has a mirror 316 and a volume dispersion diffraction grating 318 substantially fixed in orientation and displacement with respect to each other. Preferably, the mirror 316 and volume dispersion diffraction grating 318 are fixed to a rotatable table 320. Lenses 322 and 324 are arranged to have a focal point, or focal plane, substantially coincident at aperture stop 326. Similarly, lenses 328 and 94 are arranged to have a substantially coincident focal point, or focal plane, at aperture stop 88.

The rejection filter 304 is a double monochrometer with dispersion subtraction. In this case the throughput of spectrometer 300 is reduced compared to the first preferred embodiment, but the spectral range below approximately 100 cm$^{-1}$ becomes available for measurements. This spectral range is blocked by notch filters (see, FIG. 8) in the first preferred embodiment. The double monochrometer 304 with holographic dispersive gratings serves as the rejection filter for the elastically scattered and reflected radiation emitted by the sample. The first monochrometer comprises the first wavelength-tunable dispersion assembly 306, and the second monochrometer comprises the second wavelength-tunable dispersion assembly 308. The first monochrometer disperses the spectrum in the focal plane of a focusing lens 322 and 324. The aperture stop 326 is opened to accommodate the desired spectral range and to suppress the elastically scattered and reflected light. The second substantially identical monochrometer recombines the spectrum and suppresses further the unwanted radiation. The exit slit 88 of this monochrometer serves as an entrance slit of the spectrograph 36. Both monochrometers can be tuned through the whole available spectral range in a cooperative manner, which can be done preferably by mechanical coupling. For this third preferred embodiment, it is preferable to use a neutral beamsplitter instead of the dispersive beamsplitter 28, because the dispersive beamsplitter 28 has a relatively wide notch and secondary notches in the transmission spectrum (FIG. 4B). The use of a double subtractive monochrometer with holographic optics instead of conventional reflection surface relief grating spectrometers has substantially larger throughput, a higher level of rejection, and a more compact design.

In the above-illustrated examples of spectrometers, monochrometer, spectrographs, wavelength tunable beam splitters and optical bandpass filters, the support stages are rotatable stages such as rotatable support tables. This is desirable due to its simplicity in construction and operation. However, one skilled in the art should recognize from the above description that there are many other constructions which permit one to rotate or otherwise move a volume dispersion diffraction grating and mirror together substantially as a unit about a common axis of rotation, etc. without departing from the scope of this invention. Furthermore, one skilled in the art should recognize that the mechanical components can be manually operated or may be automated such as being connected to electrical operating and control devices. Furthermore, a plurality of support stages within a spectrometer may be individually movable, independent of the remaining support stages, or they may be mechanically or electrically linked to move in coordination.

A tunable spectrograph with a holographic volume grating according to any one of the preferred embodiments of the present invention has an advantage that while it has the same spectral resolution as conventional grating spectrographs, it has two or three times smaller focal length and two to three times smaller f-number. This feature arises from two factors. First, gratings with considerably larger groove density (fringe density, for a transmission grating) can be used for the same spectral range without sacrificing the throughput of the system. This is because the transmission grating efficiency can be easily optimized for any wavelength by varying its thickness and amplitude of variation of the refractive index, while for the conventional reflecting grating the only variable is the groove profile, which is not flexible enough. The second factor arises from the fact that most conventional spectrographs that use visible light traditionally have mirrors with off-axis spherical and/or toroidal collimating optics that lead to very substantial aberrations, which also limit the f-number. While being important for devices working in a wide spectral range (UV to near IR) because of the absence of chromatic aberrations, mirror collimating optics become obsolete for specialized multichannel spectrographs with CCD array detectors limited to 200–1000 nm spectral range and essentially optimized for 450–800 nm operation. Virtually aberration-free spectrographs with transmission volume gratings can be built with glass collimating optics, making the design of the spectrograph substantially more compact compared to the conventional grating spectrograph with the same resolution (smaller pixels on the CCD detector would be required).

Figure 10:
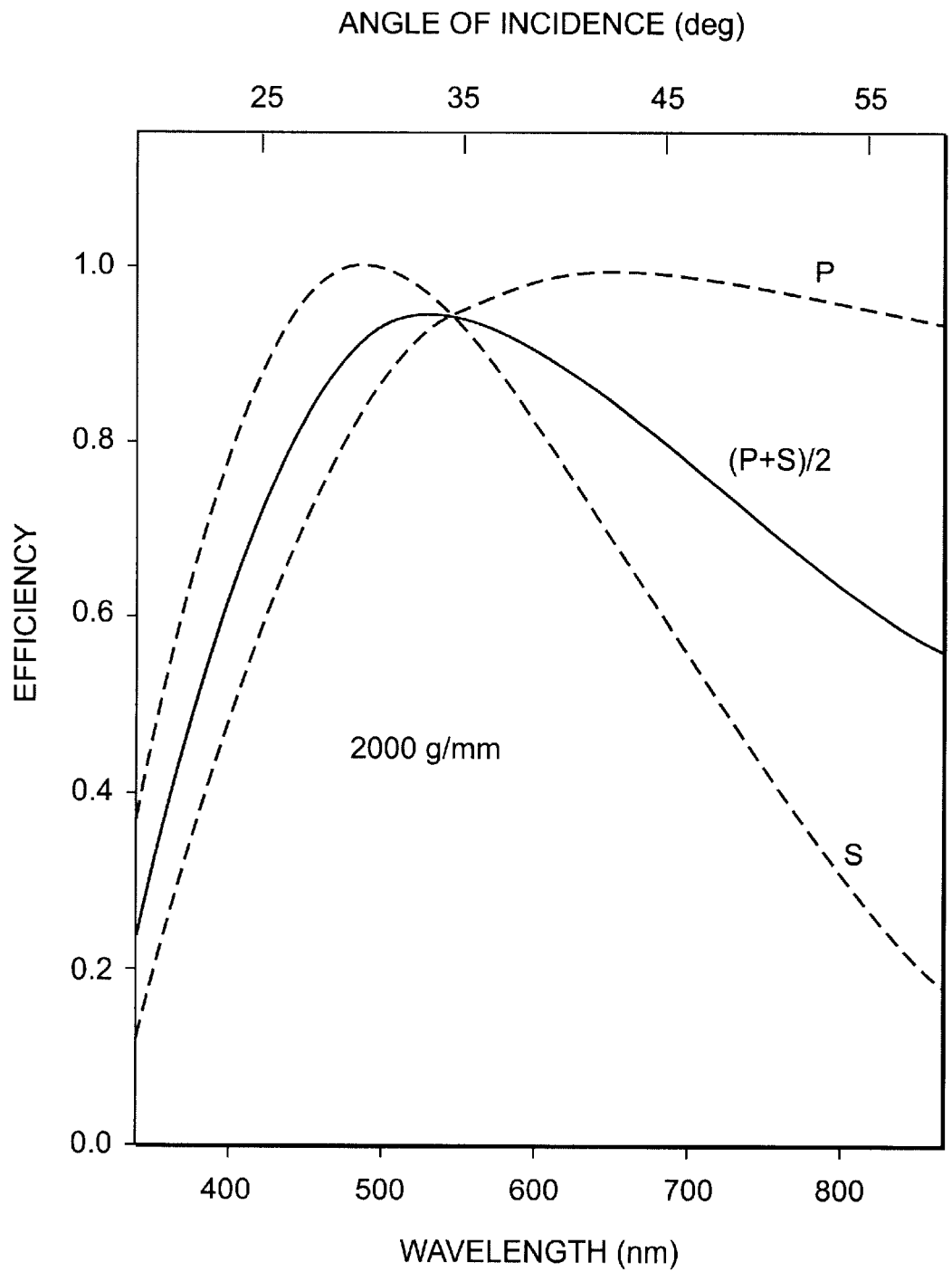
FIG. 10 shows the calculated efficiency for a volume dispersive diffraction grating as a function of wavelength and angle of incidence for two polarizations of light.
Figure 11:
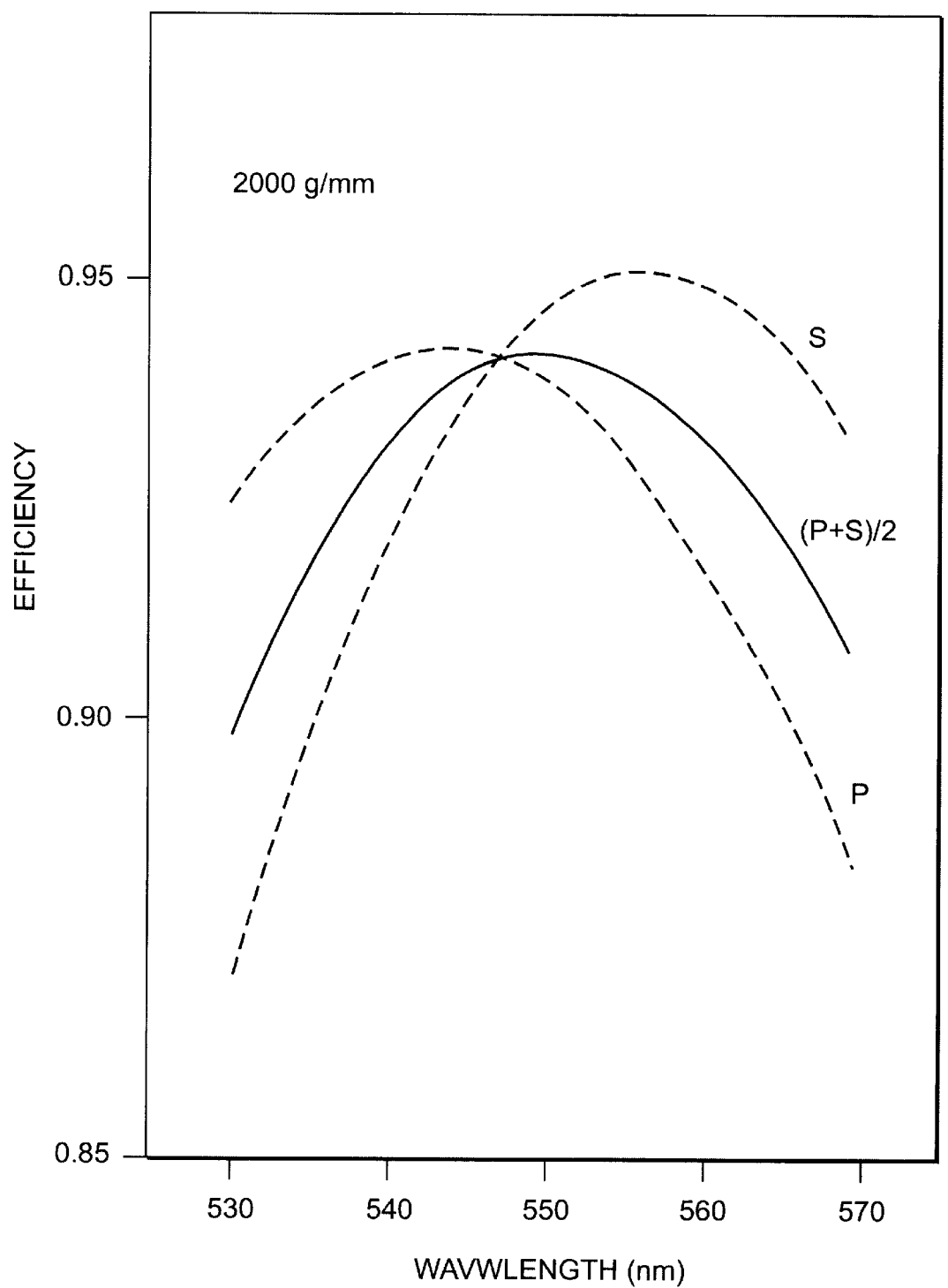
FIG. 11 shows the calculated efficiency for the volume dispersive diffraction grating as a function of wavelength for two different polarizations of light.

If the user changes the spectral position of the spectrograph with a volume transmission grating, it does not substantially deteriorate the throughput of the spectrograph. FIG. 10 shows the calculated efficiency for a suitable volume holographic grating as a function of wavelength and incident angle for two polarizations of light. In this case the density of the fringes is N=2000 fringes/mm, the average refractive index of the medium is n=1.5, the modulation of the refractive index is $\Delta n=0.07$, and the thickness is d=3.5 $\mu$m. To cover the 340–860 nm spectral range, rotating the grating by approximately ±20 degrees would be required, thus allowing one to use a grating of reasonable dimensions. The peak transmission of the grating remains high for the whole spectral range in both polarizations of the incident light. Only about 5% deterioration of the signal at the edge of the spectral window is expected for optimally thinned high-dispersion gratings (see, FIG. 11) because of dephasing effects. FIG. 11 shows the calculated efficiency for the volume holographic grating as a function of the wavelength for two different polarizations of light. The focal length of the spectrograph is f=135 mm and the array detector length is l=12.7 mm. The parameters of the grating are the same as for the case illustrated in FIG. 10.

The efficiency of the volume grating depends on the polarization of the incident light, so efficiency curves have maxima at different angle positions and wavelengths for different polarizations (see, FIG. 10). Nevertheless, this effect is quite moderate and less pronounced compared to the conventional grating.

It is advantageous to use volume dispersive diffraction gratings in beam splitters as well as optical bandpass filters and monochrometers according to this invention, at least because of their flexibility in permitting rapid and easy changes of the operating wavelength.

The above detailed description explains the invention with reference to exemplary embodiments. The scope of the invention is not limited to the examples, and is defined by the following claims.

We claim:

1. A spectrometer, comprising:
   a source of illumination radiation having a plurality of spectral wavelengths;
   a dispersive beamsplitter disposed in an optical path of said source of illumination radiation; and
   a spectrograph disposed in a path of radiation from a sample illuminated by illumination radiation from said source of illumination radiation,
   wherein said dispersive beamsplitter is tunable in correspondence to a selected one of said plurality of spectral wavelengths, and
   wherein said dispersive beamsplitter directs said selected one of said plurality of spectral wavelengths of illumination radiation to a sample and directs elastically scattered and reflected radiation from said sample out of a measurement beam of light emanating from said sample.

2. A spectrometer according to claim 1, further comprising an aperture stop disposed substantially at an intermediate focal plane between said sample and said spectrograph.

3. A spectrometer according to claim 1, further comprising an optical bandpass filter disposed in said optical path of said source of illumination radiation,
   wherein said optical bandpass filter has a wavelength-tunable passband permitting a selected one of said plurality of spectral wavelengths to pass therethrough substantially unimpeded and preventing other spectral wavelengths of said plurality of spectral wavelengths from passing therethrough.

4. A spectrometer according to claim 1, further comprising a notch filter disposed between said dispersive beamsplitter and said spectrograph.

5. A spectrometer according to claim 4, wherein said notch filter is a nondispersive volume holographic filter that is tunable by changing its orientation with respect to said measurement beam of light.

6. A spectrometer according to claim 4, wherein said notch filter is replaceably attached, thereby permitting said notch filter to be removed and replaced by a second notch filter.

7. A spectrometer according to claim 1, further comprising a measurement microscope disposed between said dispersive beamsplitter and said sample, said measurement microscope having an objective lens arranged to collect said selected one of said plurality of spectral wavelengths of illumination radiation and focus it onto said sample and to collect scattered radiation on a return path from said sample.

8. A spectrometer according to claim 3, wherein said optical bandpass filter comprises a volume dispersive diffraction grating.

9. A spectrometer according to claim 1, wherein said spectrograph comprises a volume dispersive diffraction grating.

10. A spectrometer according to claim 1, further comprising a monochrometer disposed between said source of illumination radiation and said dispersive beamsplitter.

11. A spectrometer according to claim 10, wherein said monochrometer comprises a volume dispersive diffraction grating.

12. A spectrometer, comprising:
a source of illumination radiation having a plurality of spectral wavelengths;
a beamsplitter disposed in an optical path of said source of illumination radiation;
a spectrograph disposed in a path of radiation from a sample illuminated by illumination radiation from said source of illumination radiation;
an optical bandpass filter disposed in said optical path of said source of illumination radiation; and
a rejection filter disposed in said path of radiation from said sample between said sample and said spectrograph,
wherein at least one of said beamsplitter, said spectrograph, said optical bandpass filter, and said rejection filter comprises a wavelength-tunable dispersion assembly comprising a mirror and a volume-dispersion diffraction grating, said mirror having a substantially fixed orientation and displacement with respect to said volume-dispersion diffraction grating, and
wherein said volume-dispersion diffraction grating and said mirror are movable together substantially as a unit.

13. A spectrometer according to claim 12, wherein said beamsplitter is a nondispersive beamsplitter.

14. A spectrometer according to claim 12, wherein said rejection filter comprises said wavelength-tunable dispersion assembly and a second wavelength-tunable dispersion assembly, said second wavelength-tunable dispersion assembly comprising a second mirror and a second volume-dispersion diffraction grating, said second mirror having a substantially fixed orientation and displacement with respect to said second volume-dispersion diffraction grating, and wherein said second volume-dispersion grating and said second mirror are movable together substantially as a unit.

15. A spectrograph, comprising:
an input aperture;
a detector having a substantially fixed position and a substantially fixed orientation with respect to said input aperture; and
a wavelength-tunable dispersion assembly disposed between said input aperture and said detector, said wavelength-tunable dispersion assembly comprising a mirror, a volume-dispersion diffraction grating and a support stage, said mirror having a substantially fixed orientation and displacement with respect to said volume-dispersion diffraction grating, said support stage has a surface to which said volume-dispersion diffraction grating and said mirror are mounted, said support stage being rotatable about an axis of rotation substantially orthogonal to said surface of said support stage,
wherein said volume-dispersion diffraction grating said mirror are movable together substantially as a unit with respect to said input aperture and said detector to effect a change in wavelengths of light directed to said detector after passing through said input aperture to said wavelength-tunable dispersion assembly.

16. A spectrograph according to claim 15, wherein said volume-dispersion diffraction grating and said mirror each have a substantially flat surface each of which is substantially orthogonal to said surface of said support stage, and
wherein a plane coincident with said substantially flat surface of said volume-dispersion diffraction grating and a plane coincident with said substantially flat surface of said mirror intersect each other along a line that substantially coincides with said axis of rotation.

17. A spectrograph according to claim 15, wherein said wavelength-tunable dispersion assembly further comprises a second mirror and a second volume-dispersion diffraction grating, said second mirror having a substantially fixed orientation and displacement with respect to said second volume-dispersion diffraction grating, and
wherein said second volume-dispersion diffraction grating and said second mirror are movable together substantially as a unit with respect to said input aperture and said detector to effect a change in wavelengths of light directed to said detector after passing through said input aperture to said wavelength-tunable dispersion assembly.

18. A spectrograph according to claim 17, wherein said wavelength-tunable dispersion assembly further comprises a second support stage to which said second volume-dispersion diffraction grating and said second mirror are mounted.

19. A spectrograph according to claim 18, wherein said second support stage has a surface to which said second volume-dispersion diffraction grating and said second mirror are mounted, said second support stage being rotatable about a second axis of rotation substantially orthogonal to said surface of said second support stage.

20. A spectrograph according to claim 19, wherein said second volume-dispersion diffraction grating and said second mirror each have a substantially flat surface each of which is substantially orthogonal to said surface of said second support stage, and
wherein a plane coincident with said substantially flat surface of said second volume-dispersion diffraction grating and a plane coincident with said substantially flat surface of said second mirror intersect each other along a line that substantially coincides with said second axis of rotation.

21. A spectrograph according to claim 20, further comprising a third support stage to which said first and second support stages are rotatably attached.

22. A spectrograph according to claim 21, wherein said third support stage rotates about a third axis of rotation, said first and second support stages being attached to said third support stage such that said first, second and third axes of rotation are all substantially parallel to each other.

23. A spectrograph according to claim 22, further comprising a drive assembly operatively attached to said first, second and third support stages, said drive assembly having a drive motor that causes at least one of said first support stage to rotate about said first axis of rotation, said second support stage to rotate about said second axis of rotation, and said third support stage to rotate about said third axis of rotation, wherein rotation of said third support stage rotates said first and second support stages into and out of observation positions.

24. A spectrograph according to claim 15, wherein said input aperture is an entrance aperture having a variable width to tune the spectral resolution.

25. A spectrograph according to claim 15, further comprising:

a collimating lens disposed between said input aperture and said wavelength-tunable dispersion assembly; and a condensing lens disposed between said wavelength-tunable dispersion assembly and said detector, wherein said input aperture is substantially at a focal plane of said collimating lens, and said detector is substantially at a focal plane of said condensing lens.

26. A spectrograph according to claim 15, wherein said detector is a two-dimensional imaging detector.

27. A spectrograph according to claim 26, wherein said two-dimensional imaging detector comprises a CCD array.

28. A spectrograph according to claim 15, wherein said volume-dispersion diffraction grating is a holographic volume-dispersion diffraction grating.

* * * * *

UNITED STATES PATENT AND TRADEMARK OFFICE
CERTIFICATE OF CORRECTION

PATENT NO. : 6,583,873 B1
DATED : June 24, 2003
INVENTOR(S) : Alexander F. Goncharov et al.

It is certified that error appears in the above-identified patent and that said Letters Patent is hereby corrected as shown below:

Drawings,
Please replace Fig. 2 with the following:

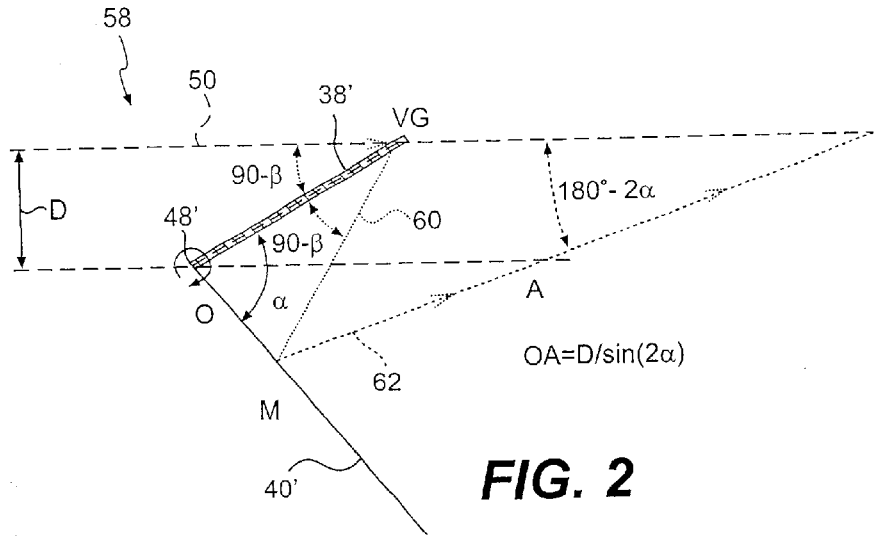

FIG. 2

Signed and Sealed this

Twentieth Day of July, 2004

JON W. DUDAS
*Acting Director of the United States Patent and Trademark Office*